US012665420B2

(12) United States Patent
Sharma et al.

(10) Patent No.: US 12,665,420 B2
(45) Date of Patent: Jun. 23, 2026

(54) MESH-BASED ARCHITECTURE FOR DC MICROGRID CONTROL TO ACHIEVE ACCURATE CURRENT SHARING AMONG CONVERTERS

(71) Applicant: North Carolina State University, Raleigh, NC (US)

(72) Inventors: Shrivatsal Sharma, Raleigh, NC (US); Subhashish Bhattacharya, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 31 days.

(21) Appl. No.: 18/413,934

(22) Filed: Jan. 16, 2024

(65) Prior Publication Data

US 2024/0243571 A1    Jul. 18, 2024

Related U.S. Application Data

(60) Provisional application No. 63/480,036, filed on Jan. 16, 2023.

(51) Int. Cl.
*H02J 1/10* (2026.01)
*H02J 1/102* (2026.01)
*H02J 3/36* (2006.01)

(52) U.S. Cl.
CPC .............. *H02J 1/106* (2020.01); *H02J 1/102* (2013.01); *H02J 3/36* (2013.01)

(58) Field of Classification Search
CPC ........... H02J 3/36; H02J 3/381; H02J 3/46–50
See application file for complete search history.

(56) References Cited

U.S. PATENT DOCUMENTS

| | | | |
|---|---|---|---|
| 9,876,356 B2 | 1/2018 | Hongbo-Sun et al. | |
| 2011/0068627 A1 | 3/2011 | Ou | |
| 2020/0169083 A1* | 5/2020 | Zubieta ..................... | H02J 1/06 |

FOREIGN PATENT DOCUMENTS

| | | | | | |
|---|---|---|---|---|---|
| CN | 110601167 A | * | 12/2019 | ............... | H02J 1/10 |
| CN | 111711217 A | * | 9/2020 | ............. | H02J 3/002 |
| KR | 20200049000 A | * | 5/2020 | ................ | H02J 1/10 |

OTHER PUBLICATIONS

P.-H. Huang, P.-C. Liu, W. Xiao and M. S. El Moursi, "A Novel Droop-Based Average Voltage Sharing Control Strategy for DC Microgrids," Sep. 23, 2014, in IEEE Transactions on Smart Grid, vol. 6, No. 3, pp. 1096-1106, May 2015. (Year: 2014).*

(Continued)

*Primary Examiner* — Rexford N Barnie
*Assistant Examiner* — David A Shiao
(74) *Attorney, Agent, or Firm* — Thomas | Horstemeyer, LLP

(57) ABSTRACT

Various examples are provided related to DC microgrid control. In one example, a system includes a mesh DC microgrid network having at least 4 microgrid DC nodes. The mesh DC microgrid network can be organized as clusters of three node DC microgrid systems, where each cluster include three of the at least 4 microgrid DC nodes. In each cluster, one of DC microgrid nodes is a pivot node that links remaining clusters together within the mesh DC microgrid network. Each DC microgrid node of the mesh DC microgrid network is directly connected to the pivot node. In another example, a mesh DC microgrid network includes one or two remaining microgrid DC nodes directly connected to a pivot node by a tie-line including a tie-line current sensor. One or more converters at the remaining DC microgrid nodes can be controlled using feedforward control with droop control using tie-line current sensor information.

11 Claims, 19 Drawing Sheets

(56) References Cited

OTHER PUBLICATIONS

A. Tah and D. Das, "An Enhanced Droop Control Method for Accurate Load Sharing and Voltage Improvement of Isolated and Interconnected DC Microgrids," Mar. 15, 2016, in IEEE Transactions on Sustainable Energy, vol. 7, No. 3, pp. 1194-1204, Jul. 2016. (Year: 2016).*

English machine translation of CN110601167A published Dec. 20, 2019 (Year: 2019).*

English machine translation of CN111711217A published Sep. 25, 2020 (Year: 2020).*

Liu, Y.; Wang, J.; Li, N.; Fu, Y.; Ji, Y. "Enhanced Load Power Sharing Accuracy in Droop-Controlled DC Microgrids with Both Mesh and Radial Configurations". Apr. 29, 2015. Energies 2015, 8, 3591-3605. (Year: 2015).*

Z. Xiangchen, Z. Guohui and Z. Jinbin, "Impedance Detection Based on Ripple Analysis and Current Sharing Control in DC Microgrid," Feb. 27, 2020, in IEEE Access, vol. 8, pp. 43554-43562, 2020. (Year: 2020).*

English machine translation of KR20200049000A published May 8, 2020 (Year: 2020).*

A. Tah and D. Das, "An Enhanced Droop Control Method for Accurate Load Sharing and Voltage Improvement of Isolated and Interconnected DC Microgrids," in IEEE Transactions on Sustainable Energy, vol. 7, No. 3, pp. 1194-1204, Jul. 2016.

C. Liu, J. Zhao, S. Wang, W. Lu and K. Qu, "Active Identification Method for Line Resistance in DC Microgrid Based on Single Pulse Injection," in IEEE Transactions on Power Electronics, vol. 33, No. 7, pp. 5561-5564, Jul. 2018.

M. N. Bin Shaheed and Y. Sozer, "Adaptive Line Impedance Estimation Algorithm for DC Microgrid Systems," 2021 IEEE Applied Power Electronics Conference and Exposition (APEC), 2021, pp. 62-67.

H. Hussaini, T. Yang, Y. Gao, C. Wang, M. A. A. Mohamed and S. Bozhko, "Artificial Neural Network Aided Cable Resistance Estimation in Droop-Controlled Islanded DC Microgrids," IECON 2021—47th Annual Conference of the IEEE Industrial Electronics Society, 2021, pp. 1-7.

* cited by examiner

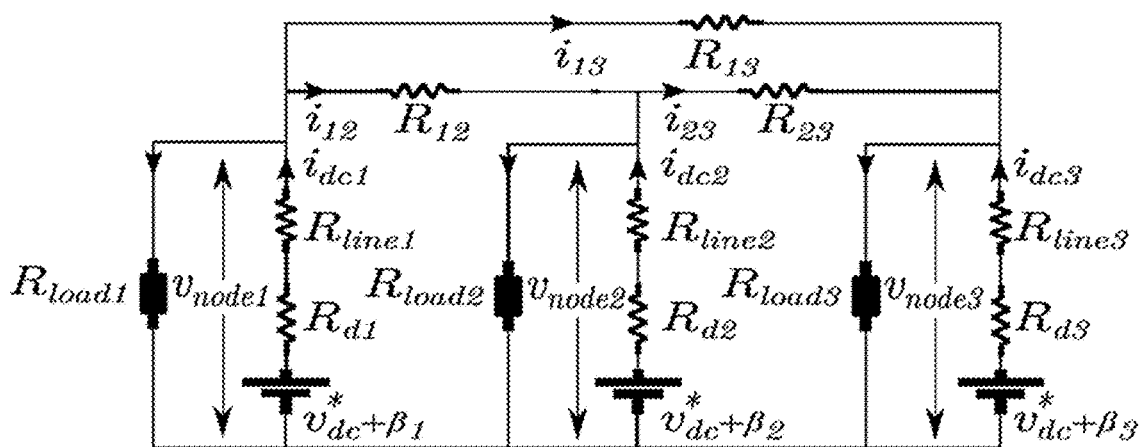
FIG. 5A
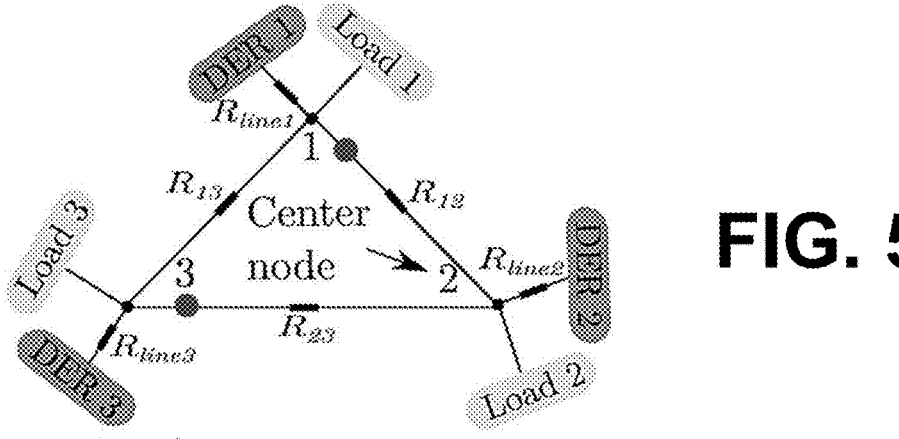
- Tie-line current sensor
FIG. 5B
COMBINATIONS OF $i$, $j$, AND $k$ FOR THREE-NODE SYSTEM
| Equation | Combinations |
|---|---|
| (8) | $i = 1, j = 2, k = 3$;   $i = 2, j = 1, k = 3$;   $i = 3, j = 2, k = 1$ |
| (9) ; (13) | $i = 1, j = 2$;   $i = 2, j = 3$;   $i = 1, j = 3$ |
FIG. 5C COMBINATIONS OF $i$, $j$, AND $k$ FOR FOUR-NODE SYSTEM

| Equation | Combinations |
|---|---|
| (8) | $i = 1, j = 2, k = 4$;   $i = 2, j = 1, k = 3$;   $i = 3, j = 2, k = 4$; $i = 4, j = 1, k = 3$ |
| (9) : (13) | $i = 1, j = 2$;   $i = 2, j = 3$;   $i = 4, j = 3$;   $i = 1, j = 4$ |

SYSTEM PARAMETERS FOR STABILITY ANALYSIS

| Impact of $R_{d2}$ | Impact of $R_{12}$ | Impact of $K_{pv}$ |
|---|---|---|
| $R_{d1} = 2.5\Omega$ | $R_{d1} = 2.5\Omega$ | $R_{d1} = 2.5\Omega$ |
| $0.1\Omega < R_{d2} < 10\Omega$ | $R_{d2} = 2.5\Omega$ | $R_{d2} = 2.5\Omega$ |
| $R_{12} = 2\Omega$ | $0.5\Omega < R_{12} < 5\Omega$ | $R_{12} = 2\Omega$ |
| $R_{line1} = R_{line2} = 1\Omega$ | $R_{line1} = R_{line2} = 1\Omega$ | $R_{line1} = R_{line2} = 1\Omega$ |
| $K_{pv} = 0.2$ $K_{iv} = 0.5$ | $K_{pv} = 0.2, K_{iv} = 0.5$ | $0 < K_{pv} < 2$ $K_{il} = 0.5$ |

FIG. 14A
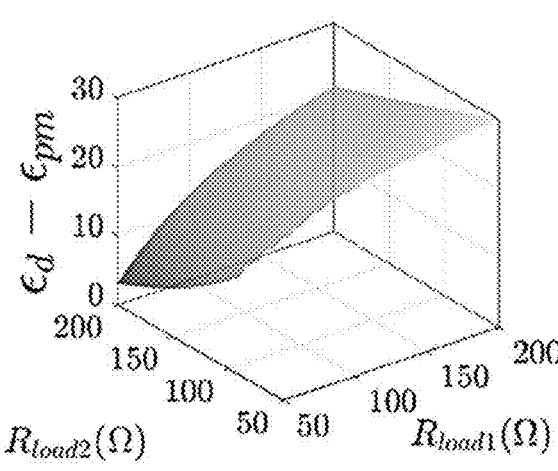
(a)
FIG. 14B
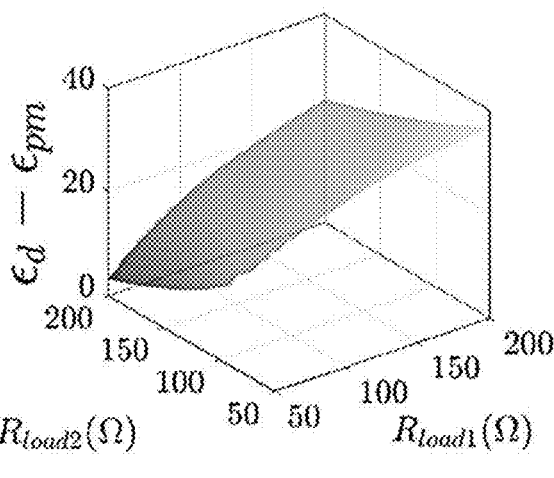
(b)
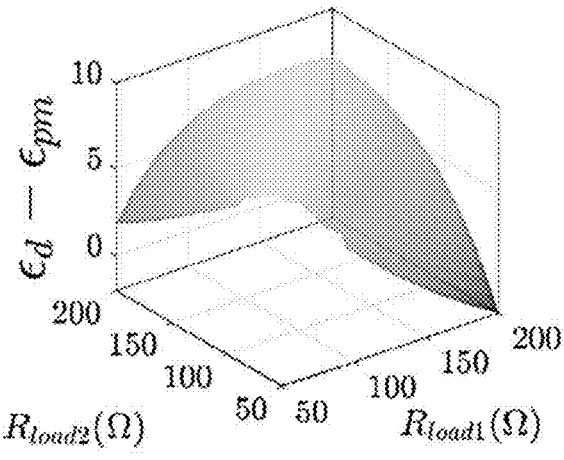
(c)
FIG. 14C
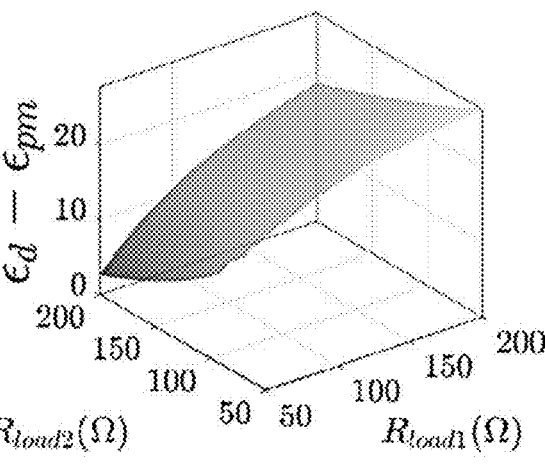
(d)
FIG. 14D ● Tie-line current sensor

SYSTEM PARAMETERS

| Parameters | Symbol | Value |
|---|---|---|
| Nominal voltage | $v_{dc}^*$ | 300 V |
| Minimum allowed voltage | $v_{min-dc}$ | 285 V |
| Cable resistances | $R_{line1,2,3}$ | 1 Ω, 1 Ω, 1 Ω |
| Tie-line cable resistances | $R_{12}, R_{13}, R_{23}$ | 2 Ω, 2 Ω, 2 Ω |
| Droop resistances | $R_{d1,2,3}$ | 2.5 Ω, 5 Ω, 5 Ω |
| Current ratings of converters | $I_{max1,2,3}$ | 6 A, 3 A, 3 A |
| Switching frequency | $f_{sw}$ | 50 kHz |

Bias power supply

Interface board and Controller

DC/DC Converters

Tie-line resistances

Loads

Tie-line current sensors

Center Node

Voltage sensor

SecondaryBridge 4 channel gate drivers

Primary Bridge

DAB inductor

Electrical to optical PWM converter

TMS320F2837xD

MESH-BASED ARCHITECTURE FOR DC MICROGRID CONTROL TO ACHIEVE ACCURATE CURRENT SHARING AMONG CONVERTERS

CROSS REFERENCE TO RELATED APPLICATIONS

This application claims priority to, and the benefit of, U.S. provisional application entitled "Novel Mesh-Based Architecture for DC Microgrid Control to Achieve Accurate Current Sharing Among Converters" having Ser. No. 63/480,036, filed Jan. 16, 2023, which is hereby incorporated by reference in its entirety.

BACKGROUND

DC Microgrids (MGs) have become quite popular as compared to AC MGs due to the ease of integration of renewable energy sources (RESs), battery energy storage systems (BESSs), and electric vehicles (EVs), their simpler control, and better system efficiency. A DC MG system can be set up in different configurations, such as radial, ring, and mesh. Ring and mesh configurations are more reliable due to the availability of redundant feeders to supply power to various parts of the system, and thus are frequently deployed in many practical applications such as military camps, offshore wind farms, and shipboard power supplies.

SUMMARY

Aspects of the present disclosure are related to DC microgrid control.

In one aspect, among others, a system comprises a mesh DC microgrid network having at least 4 microgrid DC nodes, where the mesh DC microgrid network is organized as a plurality of clusters of three node DC microgrid systems, wherein each cluster comprises three of the at least 4 microgrid DC nodes, wherein, in each cluster, one of the DC microgrid nodes is a pivot node that links remaining clusters together within the mesh DC microgrid network, and wherein each DC microgrid node of the mesh DC microgrid network is directly connected to the pivot node. In one or more aspects, each microgrid node in the mesh DC microgrid network can have a redundant current path. The feedforward control for the converters at the remaining DC microgrid nodes can be implemented using local converter currents, tie line currents, and prior estimates of cable resistances.

In various aspects, one or more converters at the pivot node can be controlled using a feedforward control with droop control. A feedforward control term for the pivot node can be generated using a local converter current and cable resistance information. Converters at remaining DC microgrid nodes can be controlled using feedforward control with droop control. The feedforward control for the converters at the remaining DC microgrid nodes can be implemented using local converter currents, tie line currents, and prior estimates of cable resistances. The system can be enabled to provide current sharing among the DC microgrid nodes without using a communication network. Each DC microgrid node can be directly connected to the pivot node by a tie-line comprising a tie-line current sensor. In some aspects, the mesh DC microgrid network can comprise 5 or more microgrid DC nodes. The pivot node may not comprise a converter or a load.

In another aspect, a system comprises a mesh DC microgrid network having three microgrid DC nodes comprising a pivot node and two remaining microgrid DC nodes comprising one or more converters, the two remaining microgrid DC nodes directly connected to the pivot node by a tie-line comprising a tie-line current sensor, where the one or more converters at the two remaining DC microgrid nodes are controlled using feedforward control with droop control based at least in part upon tie-line current sensor information, and the system is enabled to provide current sharing among the three DC microgrid nodes without using a communication network. In one or more aspects, the feedforward control for the one or more converters at the remaining DC microgrid nodes can be implemented using local converter currents, tie line currents, and prior estimates of cable resistances. The pivot node can comprise one or more converters controlled using a feedforward control with droop control. A feedforward control term for the pivot node can be generated using a local converter current and cable resistance information. The two remaining microgrid DC nodes can be connected to each other.

In another aspect, a system comprises a mesh DC microgrid network having two microgrid DC nodes comprising a pivot node and one remaining microgrid DC nodes comprising one or more converters, the one remaining microgrid DC node directly connected to the pivot node by a tie-line comprising a tie-line current sensor, where the one or more converters at the one remaining DC microgrid node are controlled using feedforward control with droop control based at least in part upon tie-line current sensor information, and the system is enabled to provide current sharing among the two DC microgrid nodes without using a communication network. The feedforward control for the one or more converters at the one remaining DC microgrid node can be implemented using local converter currents, tie line currents, and prior estimates of cable resistances. One or more converters at the pivot node are controlled using a feedforward control with droop control. A feedforward control term for the pivot node can be generated using a local converter current and cable resistance information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A-5C illustrate an example of an equivalent circuit diagram of a three-node DC MG system, an example of a center node-based solution, and examples of combinations for the three-node system, in accordance with various embodiments of the present disclosure.

FIGS. 9A-9C illustrate examples of five-node mesh DC MG systems, in accordance with various embodiments of the present disclosure.

FIG. 10 illustrates an example of the control methodology implementation for a generalized DC MG system with control loops, in accordance with various embodiments of the present disclosure.

FIGS. 14A-14D illustrate examples of the effect of error in estimates of cable resistances on current sharing accuracy for a two-node DC MG system, in accordance with various embodiments of the present disclosure.

DETAILED DESCRIPTION

Figure 1:
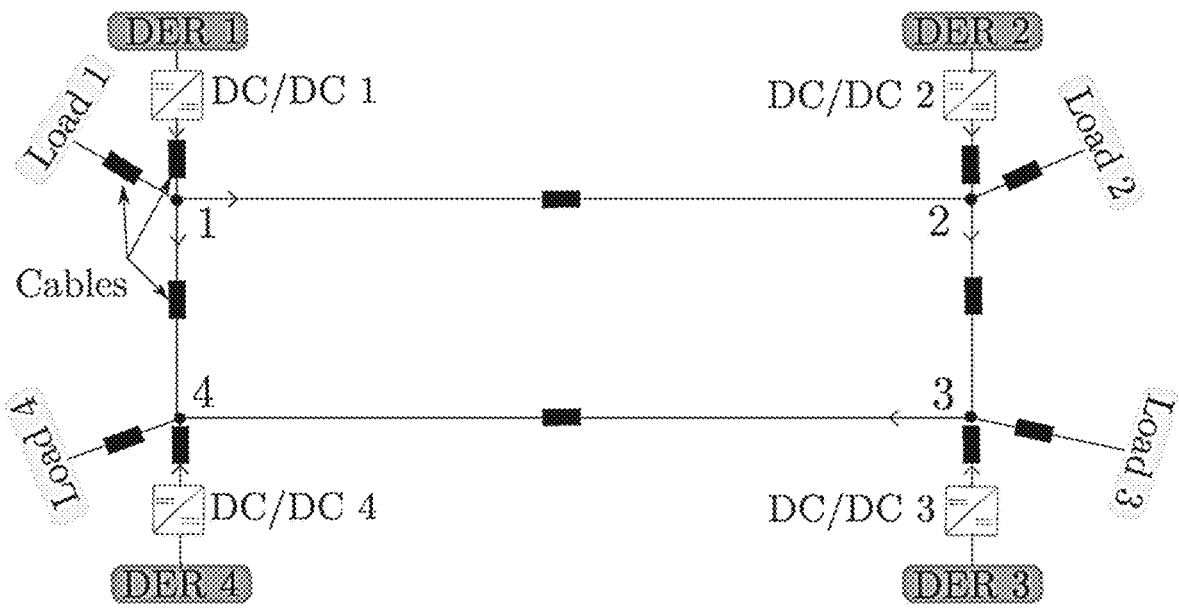
FIG. 1 graphically illustrates an example of a four-node ring DC MG system, in accordance with various embodiments of the present disclosure.

Disclosed herein are various examples related to DC microgrid control. Reference will now be made in detail to the description of the embodiments as illustrated in the drawings, wherein like reference numbers indicate like parts throughout the several views.

Considering their importance, an islanded MG with ring and mesh configurations is examined. A typical four-node ring DC MG system is shown in FIG. 1. In this example, distributed energy resources (DERs) are controlled using dc/dc converters. DERs, loads, and nodes are connected using, e.g., cables. DERs can be battery energy storage systems, electric vehicles (EVs), fuel cells, and/or renewable energy sources such as photovoltaics.

Paralleling of converters to achieve ideal current sharing is an important aspect of an MG. Current sharing in the desired ratio ensures the operation of converters within their power limits and also helps minimize the power loss in the MG system. The droop control method is commonly used to parallel the converters due to its simplicity. However, it can lead to inaccurate current sharing due to nonidealities, such as cable resistances in a DC MG. Piecewise and nonlinear droop control methods have been proposed to improve current sharing accuracy, but these methods cannot guarantee ideal current sharing. Distributed secondary control methods have been proposed to overcome the limitations of these droop control methods. However, these methods utilize a communication network to exchange information, thus countering the simple and modular nature of the droop control. Communication-based systems are also susceptible to cyber-attacks, leading to security and stability related concerns. Cyber-attacks can become a concern for the MGs setup in military camps. Without using a communication network, the decentralized control method proposed in and uses the estimates of cable resistances to achieve accurate current sharing. However, the methods are limited to only radial configurations of islanded DC MGs. For ring and mesh MG systems, the control method using the estimates of cable resistances presents different challenges due to the voltage drops across the tie-line cables.

A new, practical, and scalable mesh configurations for DC microgrids is presented here. The new mesh configurations are inspired by concepts in graph theory. A decentralized secondary droop control method without involving communication complexity is presented. The proposed control method eliminates the limitations of the conventional droop control method in the scenarios where the cable resistances in a DC microgrid system cannot be neglected. The new mesh configurations with the proposed control method achieve accurate current sharing among all the converters. The effectiveness and performance of the proposed control method are validated using circuit simulations and hardware-based experiments on existing and proposed configurations of multi-converter DC microgrid systems.

Proposed Mesh Configurations and Control Method

Figure 2:
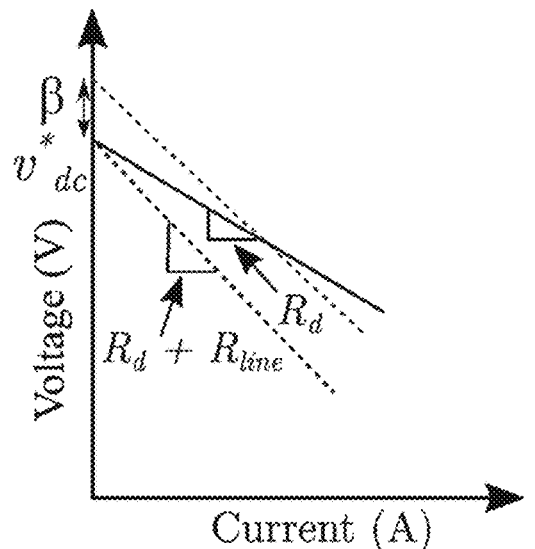
FIG. 2 illustrates an example of typical droop characteristics, in accordance with various embodiments of the present disclosure.

In a DC MG, the current sharing accuracy with the conventional droop control is affected due to cable impedances. For a DC system, in the steady-state conditions, the inductance and capacitance of the cables do not play a role. Hence the impact of cable impedances can be studied using only cable resistances. Typical droop characteristics of a converter with and without cable resistances are shown in FIG. 2. Here, $v_{dc}{}^*$, is the reference voltage, and $R_d$ and $R_{line}$ are the droop resistance and cable resistance, respectively. To overcome the limitations of the droop control, either the reference voltages of the converters are changed, or the droop resistances are modified. In the proposed control method, the reference voltage of a converter is modified by a voltage offset, $\beta$. The droop characteristic with $\beta$ is also shown in FIG. 2. In existing methods, typically, a communication network is used to exchange information between different converters to calculate suitable $\beta$. In the proposed control method, $\beta$ is implemented as a feed-forward term in the converter's reference voltage without involving communication complexity.

For ring and mesh DC MG systems, the current sharing accuracy deteriorates due to the resistances of cables connecting the DERs to the nodes and cables connecting the nodes. These cable resistances are depicted in FIG. 1. Prior estimates of cable resistances, local converter currents, and tie-line currents are utilized to determine $\beta$. The estimates of cable resistances can be obtained using the cable datasheets or cable models available in literature. Tie-line currents are obtained locally by placing tie-line current sensors close to the nodes. With the proposed control method, the challenges and possible solutions to determine $\beta$ are discussed in the next sections for DC MG systems with two nodes, three nodes, and four nodes. New and scalable mesh configurations are proposed for DC MGs with more than four nodes.

Figure 3A:
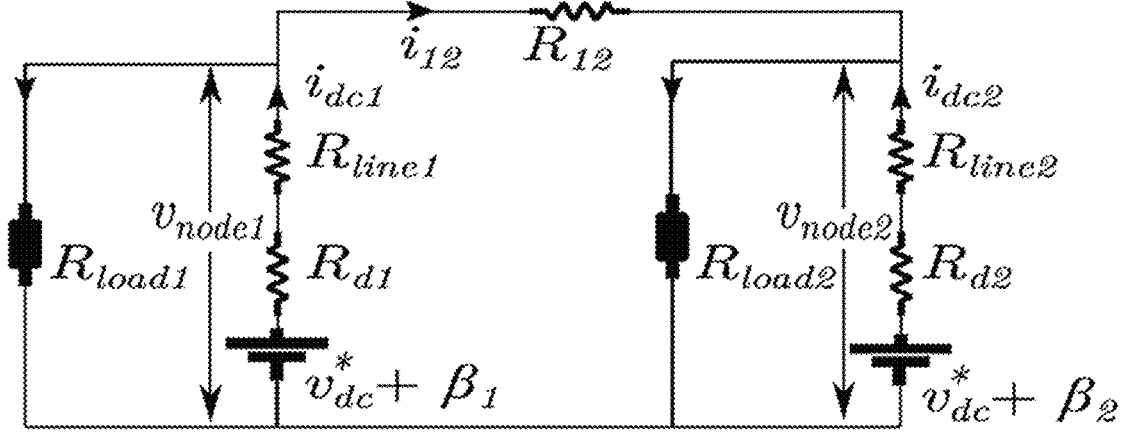
FIGS. 3A and 3B illustrate an example of an equivalent circuit diagram of a two-node DC MG system and an example of a center node-based solution, in accordance with various embodiments of the present disclosure.

DC MG System with Two Nodes. An equivalent circuit diagram of a two-node DC MG system with one load and one DER at each node is shown in FIG. 3A. Here, $v_{dc}{}^*$ is the reference voltage. $\beta_1$ and $\beta_2$ are the modifications to the reference voltages of converters one and two, respectively. $i_{dc1}$ and $i_{dc2}$ are the output currents of converters one and two, respectively, and $i_{12}$ is the tie-line current. The loads at node one and node two are $R_{load1}$ and $R_{load2}$, respectively. The DERs are connected to the nodes with resistances Rline1 and Rline2. The nodes are connected with a cable of resistance $R_{12}$. Assuming the direction of tie-line current as shown in FIG. 3A, the equations for this system using Kirchhoff's Voltage Law (KVL) are given by the following equations:

$$v_{dc}^* + \beta_1 - i_{dc1}(R_{d1} + R_{line1}) - (i_{dc1} - i_{12})R_{load1} = 0 \tag{1}$$

$$v_{dc}^* + \beta_2 - i_{dc2}(R_{d2} + R_{line2}) - (i_{dc2} + i_{12})R_{load2} = 0 \tag{2}$$

$$v_{dc}^* + \beta_1 - i_{dc1}(R_{d1} + R_{line1}) - i_{12}R_{12} + i_{dc2}(R_{d2} + R_{line2}) - \beta_2 - v_{dc}^* = 0. \tag{3}$$

By substituting β1 and β2 as zero in Eqs. (1)-(3), the current sharing ratio with the conventional droop is given by the following equation:

$$\frac{i_{dc1}}{i_{dc2}} = \frac{R_{12}(R_{d2} + R_{load2} + R_{line2}) + (R_{d2} + R_{line2})(R_{load1} + R_{load2})}{R_{12}(R_{d1} + R_{load1} + R_{line1}) + (R_{d1} + R_{line1})(R_{load1} + R_{load2})}. \tag{4}$$

It can be seen that the current sharing accuracy with the conventional droop control gets degraded due to cable resistances. To achieve accurate current sharing, the relation between $\beta_1$ and $\beta_2$ can be obtained from Eqs. (1)-(3), and is given by the following equation:

$$\beta_1 - \beta_2 = i_{dc1}R_{line1} + i_{12}R_{12} - i_{dc2}R_{line2}. \tag{5}$$

With the proposed method, $\beta_1$ and $\beta_2$ are separated into components, which are given by:

$$\beta_1 = \beta_1' + \beta_1''; \beta_2 = \beta_2' + \beta_2''. \tag{6}$$

Utilizing local converter output currents, $\beta_1'$ and $\beta_2'$ are implemented to eliminate the effect of the voltage drops across $R_{line1}$ and $R_{line2}$, respectively. Using tie-line current, $\beta_1'$ and $\beta_2'$ are implemented to eliminate the effect of voltage drop across $R_{12}$. It can be shown through substitutions that if $\beta_1'$, $\beta_2'$, $\beta_1''$, and $\beta_2''$ are given by Eq. (7), then accurate current sharing in the ratio of $R_{d2}/R_{d1}$ can be achieved:

$$\beta_1' = i_{dc1}R_{line1}; \beta_2' = i_{dc2}R_{line2}; \beta_1'' - \beta_2'' = i_{12}R_{12}. \tag{7}$$

Figure 3B:
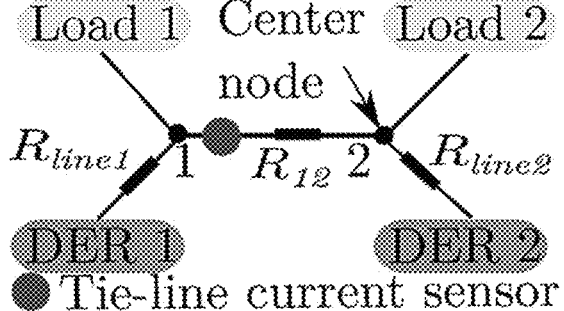

From Eq. (7), it can be also deduced that infinite combinations of $\beta_1''$ and $\beta_2''$ exist to achieve ideal current sharing among the converters. However, if both $\beta_1''$ and $\beta_2''$ share the voltage drop across $R_{12}$, tie-line current sensors at both the nodes will be needed. To minimize the number of tie-line current sensors, solution with only one tie-line current sensor is proposed and discussed. The tie-line current sensor is placed at a node where converters implement the correction for the tie-line voltage drop. The other node is called the center node or pivot node. The solution with node two as the center or pivot node is shown in the graphical representation of FIG. 3B.

Figure 4:
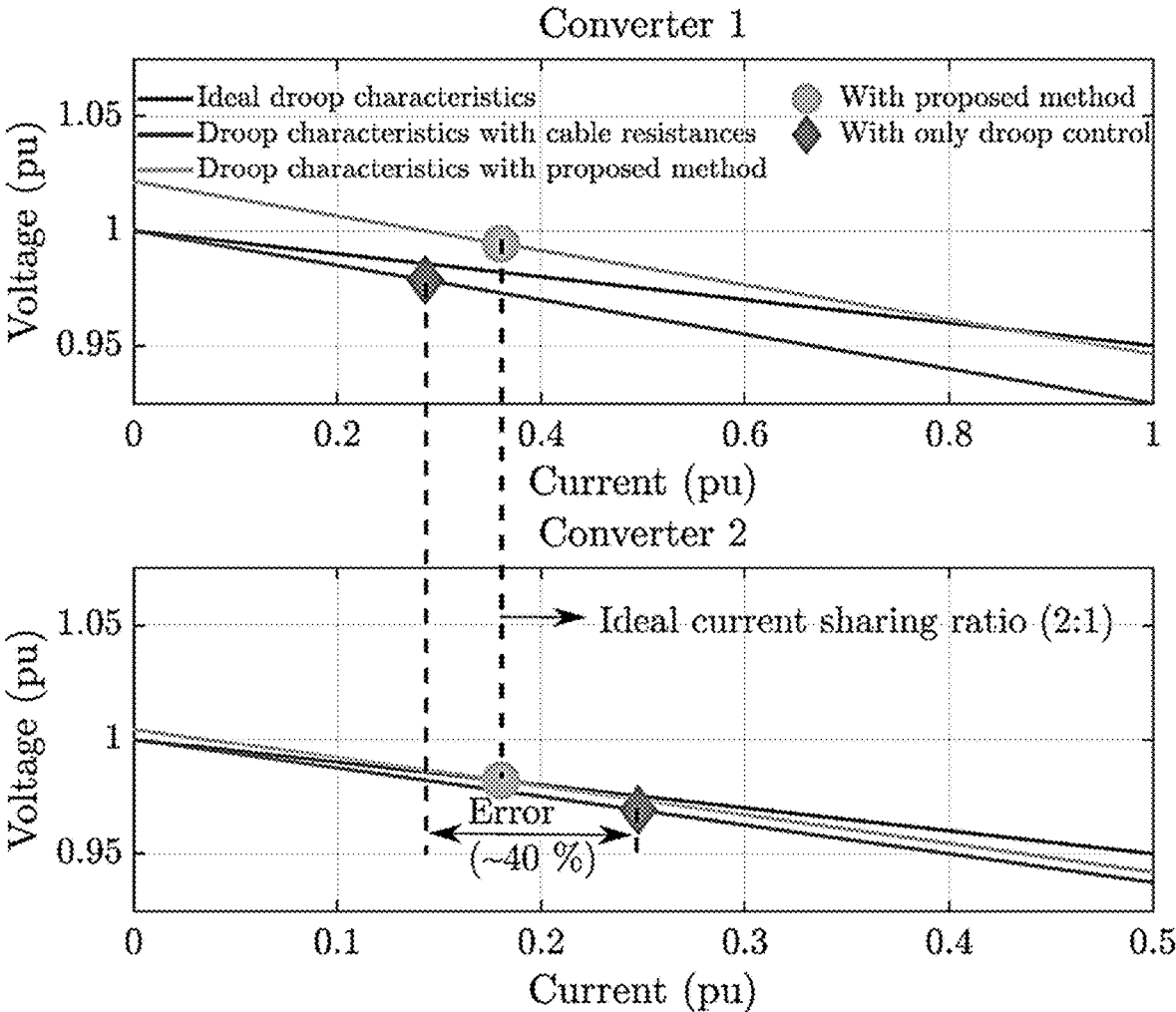
FIG. 4 is a plot illustrating an example of the proposed control method for a two-node DC MG system, in accordance with various embodiments of the present disclosure.

For a particular operating point, FIG. 4 illustrates the proposed control method for a two-node DC MG system ($R_{d1}$=0.05 pu, $R_{d2}$=0.1 pu, $R_{line}$1=0.02 pu, $R_{line2}$=0.02 pu, $R_{load1}$=20 pu, $R_{load2}$=2 pu). The droop resistances were chosen such that the ideal current sharing between the converters is in the ratio of 2:1. In this example, node two is the center or pivot node, hence $\beta_1''$=$i_{12}R_{12}$ and $\beta_2''$=0. It can be seen that the ideal current sharing is achieved with the proposed method. Similar analysis can be performed with node one as the center or pivot node.

DC MG System with Three Nodes. An equivalent circuit diagram of a three-node ring DC MG system with one DER and one load at each node is shown in FIG. 5A. The nomenclature for the two-node DC MG system can be extended to the three-node system as well. For this system, the equations using KVL are given by the following equations:

$$v_{dc}^* + \beta_i - i_{dci}(R_{di} + R_{linei}) - (i_{dci} - i_{ij} - i_{ik})R_{loadi} = 0 \tag{8}$$

$$v_{dc}^* + \beta_i - i_{dci}(R_{di} + R_{linei}) - i_{ij}R_{ij} + i_{dcj}(R_{dj} + R_{linej}) - \beta_j - v_{dc}^* = 0. \tag{9}$$

The combinations of i, j, and k for which Eqs. (8) and (9) are valid are given in the table of FIG. 5C. Here, $\beta_i$, for i=1 to 3 is the modification to the reference voltage of i-th converter.

As in the two-node system, from Eqs. (8)-(9), the relation between $\beta_i$ and $\beta_j$ to achieve accurate current sharing between converters at i-th and j-th node is given by:

$$\beta_i - \beta_j = i_{dci}R_{linei} + i_{ij}R_{ij} - i_{dcj}R_{linej}. \qquad (10)$$

In the proposed control method, $\beta_i$ is again separated into $\beta_1'$ and $\beta_1''$ and is given by:

$$\beta_i = \beta_i' + \beta_i''. \qquad (11)$$

$\beta_1'$ and $\beta_1''$ are implemented to eliminate the effect of the voltage drops across $R_{line1}$ and $R_{ij}$, respectively. It can be shown that accurate current sharing can be achieved if, $\beta_i'$, for i=1 to 3 is given by Eq. (12), and $\beta_i''$ and $\beta_j''$ are related by Eq. (13). The combinations of i and j for which Eq. (13) is valid are also given in the table in FIG. 5C:

$$\beta_i' = i_{dci}R_{linei}; \qquad (12)$$

$$\beta_i'' - \beta_j'' = i_{ij}R_{ij}. \qquad (13)$$

From Eq. (13), it can be also deduced that infinite combinations of $\beta_1''$, $\beta_2''$, and $\beta_3''$ are possible to achieve accurate current sharing. However, using the property of a three-node ring system given in Eq. (14), Eq. (13) can be reduced into two equations:

$$i_{12}R_{12} + i_{23}R_{23} - i_{13}R_{13} = 0. \qquad (14)$$

Thus, ideal current sharing can be achieved among all the converters if the constraints of any two of the three equations given in Eq. (13) are met. Similar to a two-node system, the center node-based solution requiring a minimum number of tie-line current sensors is proposed. The converters at the center node do not implement any correction for the voltage drops across the tie-line resistances. The converters at the other nodes implement the corrections for the voltage drops across the tie-line resistances. For example, if node two is defined as the center or pivot node, then $\beta_1''$, $\beta_2''$, and $\beta_3''$ are given by:

$$\beta_1'' = i_{12}R_{12}; \beta_2'' = 0; \beta_3'' = i_{32}R_{23}. \qquad (15)$$

The center node-based solution requires two current sensors. For this example, one current sensor is placed on the tie-line connecting nodes one and two, and the other is placed on the tie-line connecting nodes two and three. This solution is illustrated in FIG. 5B. It can be shown that for i=1 to 3, if $\beta_i'$ and $\beta_i''$ are substituted from Eqs. (12) and (15) into Eqs. (8)-(9), then ideal current sharing ratio given by Eq. (16) can be achieved:

$$\frac{i_{dc1}}{i_{dc2}} = \frac{R_{d2}}{R_{d1}}; \frac{i_{dc3}}{i_{dc2}} = \frac{R_{d2}}{R_{d3}}. \qquad (16)$$

A similar analysis can be used if nodes one or three are considered the center node. For ring configurations, a three-node system has the maximum number of nodes in which all the nodes are interconnected. Without using a communication network, accurate current sharing among all the converters can be achieved only till three-node systems. This is proved in the next section using a four-node ring DC MG system.

Figures 6A, 6B, 6C:
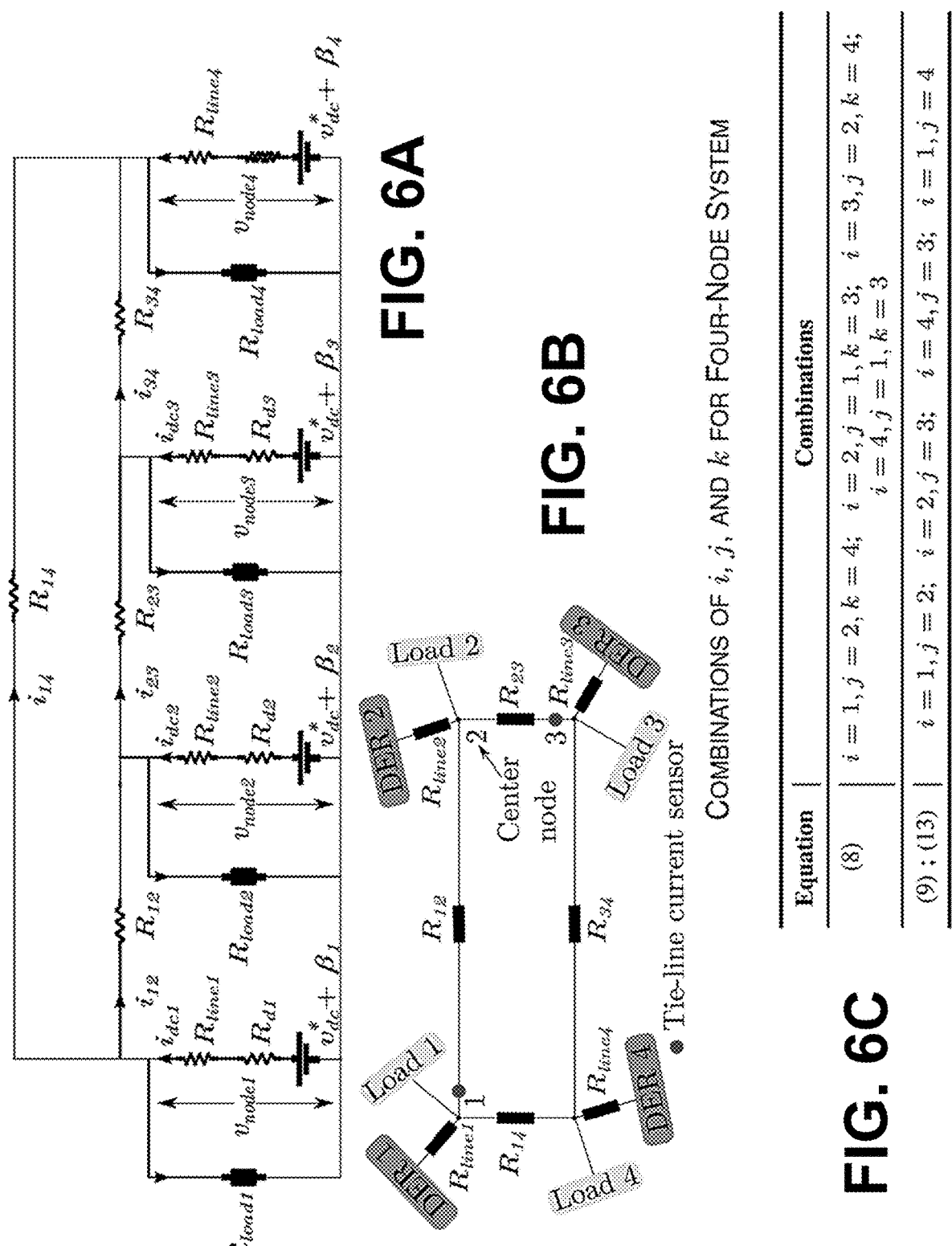
FIGS. 6A-6C and 7A-7B illustrate examples of equivalent circuit diagrams of four-node DC MG systems, examples of center node-based solutions, and examples of combinations for the four-node system, in accordance with various embodiments of the present disclosure.

DC MG System with Four Nodes. An equivalent circuit diagram of a four-node ring DC MG system with one DER and one load at each node is shown in FIG. 6A. The nomenclature is similar to the two-node and three-node DC MG systems. The equations for this system can be given by Eqs. (8) and (9). The combinations of i, j, and k for which Eqs. (8) and (9) are valid for the four-node system are given in the table in FIG. 6C. $\beta_i$ for i=1 to 4 is again given by Eq. (11).

Similar to a three-node ring DC MG, it can be shown that accurate current sharing can be achieved if $\beta_i'$ is given by Eq. (12), and $\beta_i''$ and $\beta_j''$ are related by Eq. (13). For this system, Eq. (12) is valid for i=1 to 4, and Eq. (13) is valid for combinations of i and j as given in the table in FIG. 6C. Again, Eq. (13) shows that infinite solutions of $\beta_i''$ for i=1 to 4 are possible to achieve accurate current sharing. By using Eq. (17), the four constraints in Eq. (13) can be reduced to three:

$$i_{12}R_{12} + i_{23}R_{23} + i_{34}R_{34} - i_{14}R_{14} = 0. \qquad (17)$$

However, without a communication network, for a four-node ring DC MG system, ideal current sharing cannot be achieved among all the converters. To prove this, node two is again predefined as the center or pivot node, as shown in FIG. 6B. The voltage offsets, $\beta_i''$ for i=1 to 3 are given by:

$$\beta_1'' = i_{12}R_{12}; \beta_2'' = 0; \beta_3'' = i_{32}R_{23}. \qquad (18)$$

For i=1 to 3, after substituting $\beta_i'$ from Eq. (12) and $\beta_i''$ from Eq. (18) into Eqs. (8) and (9), it can be shown that accurate current sharing among converters one, two, and three can be achieved. To ensure accurate current sharing among all the converters, $\beta_4''$ has to be given by the two solutions in:

$$\beta_4'' = i_{43}R_{34} + i_{32}R_{23}; \beta_4'' = i_{41}R_{14} + i_{12}R_{12}. \qquad (19)$$

The possible solutions of $\beta_4''$ require communication or estimation of either $i_{12}$ or $i_{32}$. Even with the prior estimates of cable resistances and knowledge of $i_{14}$ or $i_{34}$ using tie-line current sensors, it is not possible to estimate $i_{12}$ or $i_{32}$ by converter four. This is because $i_{32}$ and $i_{12}$ are the two unknowns in Eq. (17). Thus, without a communication network, ideal current sharing among all the converters for a four-node ring system cannot be achieved. However, mesh configurations can be utilized for systems with more than three nodes to achieve ideal current sharing among all the converters.

Figure 7A:
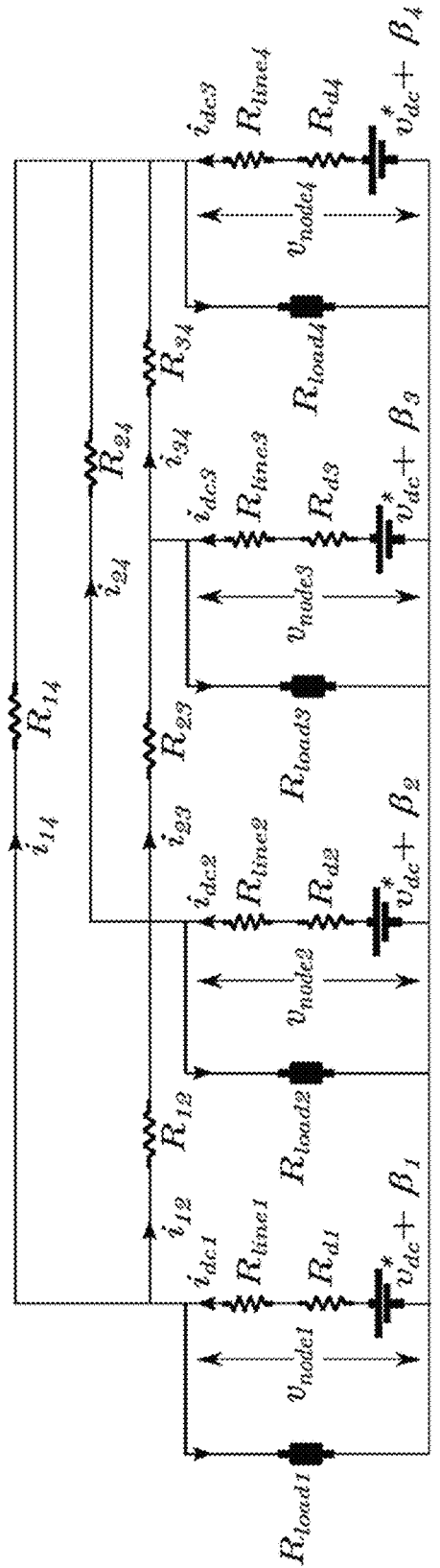
Figure 7B:
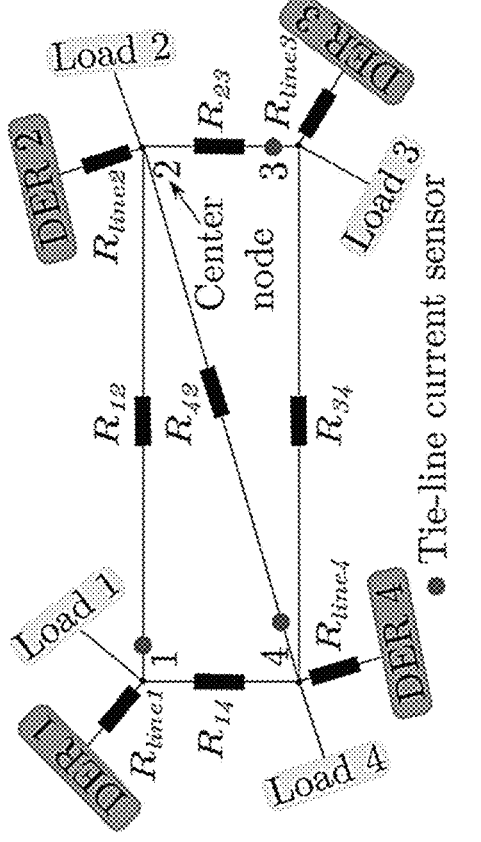

An equivalent circuit diagram and graphical representation of a four-node mesh DC MG system are shown in FIGS. 7A and 7B, respectively. For this system, Eq. (9) can be extended for i=4, j=2. With the center node-based solution, the voltage offsets for the correction of tie-line voltage drops in the reference voltages of converters one, two, and three are still given by Eq. (18). $\beta_4''$ is now given by:

$$\beta_4'' = i_{42}R_{42}. \tag{20}$$

For i=1 to 4, after substituting $\beta_i'$ from Eq. (12) and $\beta_i''$ from Eqs. (18) and (20) into Eqs. (8) and (9), accurate current sharing given by Eq. (21) can be achieved among all the converters:

$$\frac{i_{dc1}}{i_{dc2}} = \frac{R_{d2}}{R_{d1}}; \frac{i_{dc3}}{i_{dc2}} = \frac{R_{d2}}{R_{d3}}; \frac{i_{dc4}}{i_{dc2}} = \frac{R_{d2}}{R_{d4}}. \tag{21}$$

Thus, the proposed solution with mesh configuration can achieve ideal current sharing among all the converters. Similar analysis can be extended with any of the four nodes as the center or pivot node. It is interesting to note that a four-node mesh system can also be seen as the two three-node ring systems connected at the center node. These connected three-node systems and graph theory concepts are used to propose new mesh configurations for systems with more than four nodes.

DC MG System with More Than Four Nodes. The previous section described that four-node ring DC MG systems cannot achieve accurate current sharing among all the converters without a communication network. Thus, only mesh configurations are studied for DC MG systems with more than four nodes. To achieve accurate current sharing among all the converters without a communication network, the study of the four-node mesh system can be extended to form constraints for generic mesh configurations. The mesh configuration should have a center node connected to all the other nodes. Also, to retain the reliability of ring configurations, a redundant path for the current flow at each node is needed. With these constraints, mesh configurations are proposed utilizing the concept of graphs in graph theory. A graph is made of vertices connected by edges and can be visualized as a configuration for an MG. The vertices can be seen as the nodes in an MG and edges as the tie-lines. Concepts of graphs have also been previously utilized to form connections between DC MG clusters.

Figure 8:
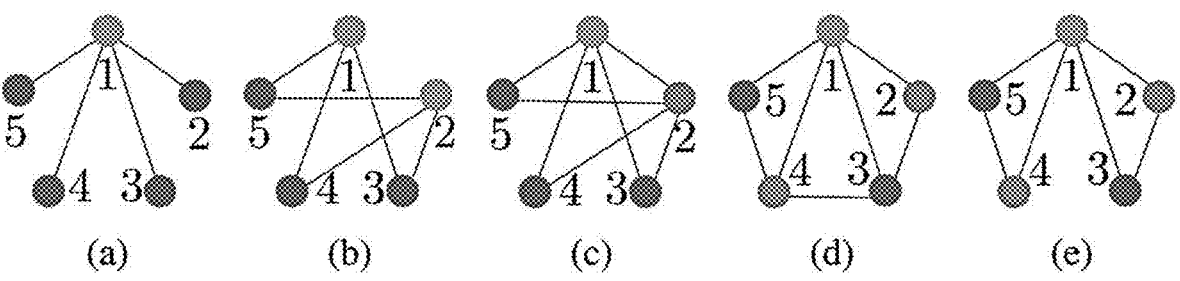
FIG. 8 illustrates examples of k-partite graphs with five vertices, in accordance with various embodiments of the present disclosure.

In this disclosure, the proposed mesh configurations are inspired by complete and k-partite graphs. In a complete graph, all vertices are connected by edges. An MG formed with a complete graph can achieve accurate current sharing among all the converters without a communication network. However, the MG will be complex as it has a lot of tie-line connections. To overcome the complexity of MG, k-partite graphs can be utilized. In a k-partite graph, vertices are partitioned into k disjoint sets such that no two endpoints of an edge belong to the same set. Examples of k-partite graphs with five vertices are shown in FIG. 8. Here, bipartite (k=2) and tripartite (k=3) graphs are shown. In FIG. 8, examples (a)-(d) show complete k-partite graphs, and example (e) shows an example of an incomplete k-partite graph. In a complete k-partite graph, there is an edge between every pair of vertices from disjoint sets. These graphs are notated with a capital letter K subscripted by a sequence of the sizes of each set in the partition.

Complete bipartite graphs, $K_{1,4}$ and $K_{2,3}$, are shown in examples (a) and (b), respectively, of FIG. 8. The two disjoint sets are shown in different colors or shades. The bipartite graph, $K_{1,4}$, is not considered as a DC MG system formed with this graph is radial, which is not considered due to its being less reliable than ring and mesh configurations. The bipartite graph, $K_{2,3}$, can also not be utilized as it does not satisfy the earlier mentioned constraint of the mesh configuration having one vertex connected to all the other vertices.

Figure 9A:
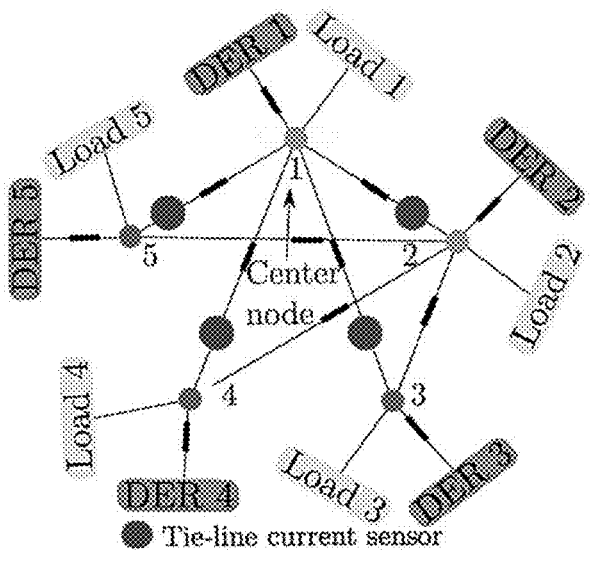
Figure 9B:
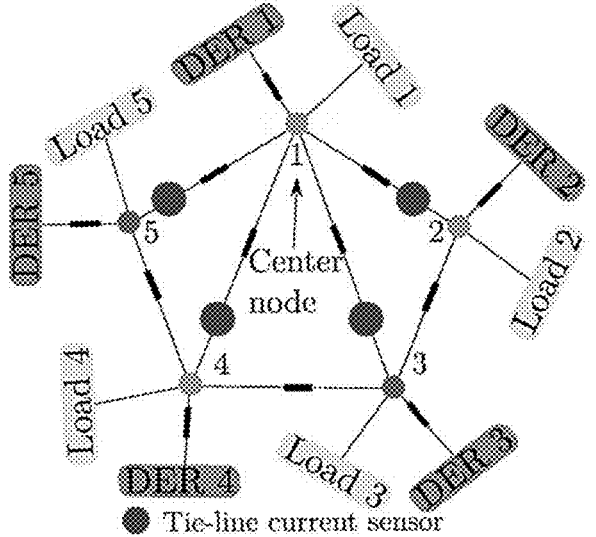
Figures 9C, 10:
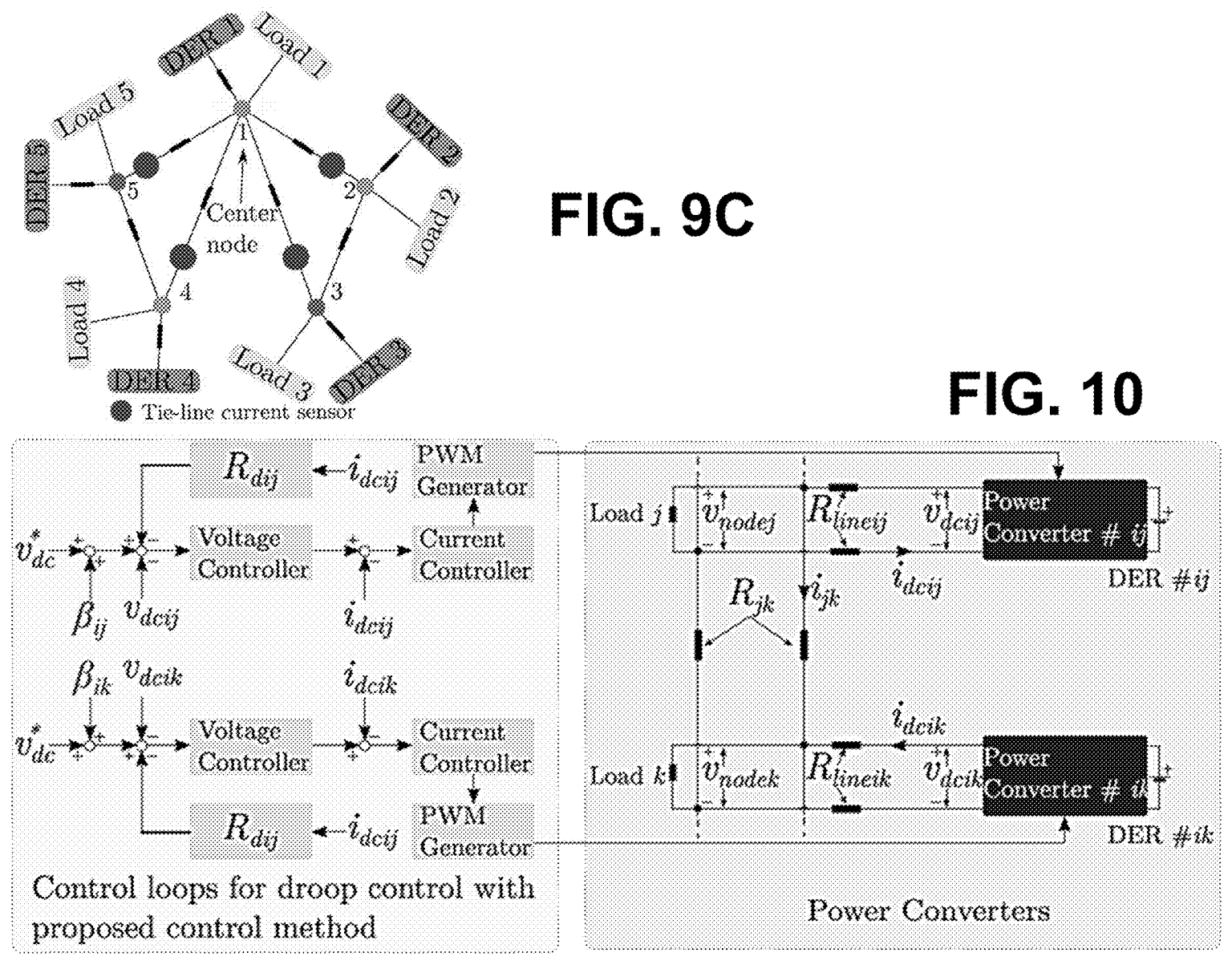

Complete tripartite graphs, $K_{1,1,3}$ and $K_{1,2,2}$, are shown in examples (c) and (d), respectively, of FIG. 8. The disjoint sets are shown with three colors or shades. In these graphs, all the vertices are connected to vertex one. Thus, these can be utilized to form new mesh configurations. To have a redundant current path at each node, it is not necessary to have a complete tripartite graph. An example of an incomplete tripartite graph is also shown in example (e) of FIG. 8. Utilizing the concepts of complete and incomplete tripartite graphs, FIGS. 9A-9C show three configurations of proposed five-node mesh DC MG systems with node one as the center or pivot node. Configurations-I and II use complete tripartite graphs, $K_{1,1,3}$ and $K_{1,2,2}$, respectively, as shown in FIGS. 9A and 9B. Configuration-III uses an incomplete tripartite graph as shown in FIG. 9C.

Generalized Proposed Mesh Configurations. The k-partite graphs can be used to form new mesh configurations of a DC MG system with any number of nodes. The concept of the new mesh configuration can be implemented at the planning stage as the locations and number of DERs and loads are typically known while forming an MG. In the new mesh configuration, any node can be selected as the center or pivot node, and all the other nodes are connected to it. The tie-line sensors are strategically placed on the tie-lines connecting the other nodes to the center node. It should be noted that the center node can even be a bypass node without having a source or a load. In the event of reconfiguration of an MG, if needed, the center node can be reassigned.

The mathematical analysis shown for a four-node mesh system can be extended to obtain the voltage offsets for a generic DC MG system with n nodes having m converters at each node and k-th node as the center or pivot node. The voltage offsets for the converters at the center (or pivot) node, $\beta_{ik}$, and the non-center nodes, $\beta_{ij}$, are given as:

$$\beta_{ik} = i_{dcik}R_{lineik}; \beta_{ij} = i_{dcij}R_{lineij} + i_{jk}R_{jk} \tag{22}$$

where $i_{dcij}$ is the output current of i-th converter at j-th node. $i_{jk}$ is the tie-line current from the j-th node to the k-th node. $R_{lineij}$ is the cable resistance connecting i-th converter to the j-th node. $R_{jk}$ is the cable resistance of tie-line connecting j-th node with the k-th node.

If DERs are placed close to the nodes, then voltage drops across the cables connecting the nodes will be negligible. In such a scenario, $R_{lineij}$ and $R_{lineik}$ can be substituted with zero in Eq. (22).

FIG. 10 shows the implementation of the proposed control method for a generalized DC MG system with control loops. The voltage offsets $\beta_{ik}$ and $\beta_{ij}$ are added to the reference voltage of the converters. In certain operating conditions, if the converter or grid voltages exceed or become less than the allowed voltages due to voltage offsets, a tertiary control method implementing a tradeoff algorithm between current sharing accuracy and voltage regulation can be used.

Stability Analysis of the Proposed Decentralized Control Method

This section presents the stability analysis of the proposed method using small-signal modeling. The analysis is shown for a two-node DC MG system and can be extended to a multimode DC MG system. The small-signal model of the proposed method with the primary droop control is derived by first obtaining the small-signal models of the voltage offsets. The small-signal terms are shown with a ^ symbol.

For the proposed control method with node 2 as the center or pivot node, as shown in FIG. 3A, $\hat{\beta}_1{}'$ and $\hat{\beta}_1{}''$ are the modifications in the reference voltage for converter 1 and $\hat{\beta}_2{}'$ is the modification in the reference voltage for the converter 2. $\hat{\beta}_1{}'$, $\hat{\beta}_1{}''$, and $\hat{\beta}_2{}'$ are given as follows:

$$\hat{\beta}_1' = \hat{i}_{dc1} R_{line1}; \hat{\beta}_1'' = \hat{i}_{12} R_{12}; \hat{\beta}_2' = \hat{i}_{dc2} R_{line2}. \tag{23}$$

Using Kirchhoff's Voltage Law (KVL), $\hat{i}_{12}$ is expressed as a function of $\hat{i}_{dc1}$, $\hat{i}_{dc2}$, and system parameters as follows:

$$\hat{i}_{12} = G_{\beta_1}(s)\hat{i}_{dc1} + G_{\beta_2}(s)\hat{i}_{dc2} \tag{24}$$

where $G_{\beta_i}(s)$ for i=1,2 as follows:

$$G_{\beta_i}(s) = \frac{Z_{loadi}}{Z_{load1} + Z_{load2} + R_{12}}. \tag{25}$$

Figure 11:
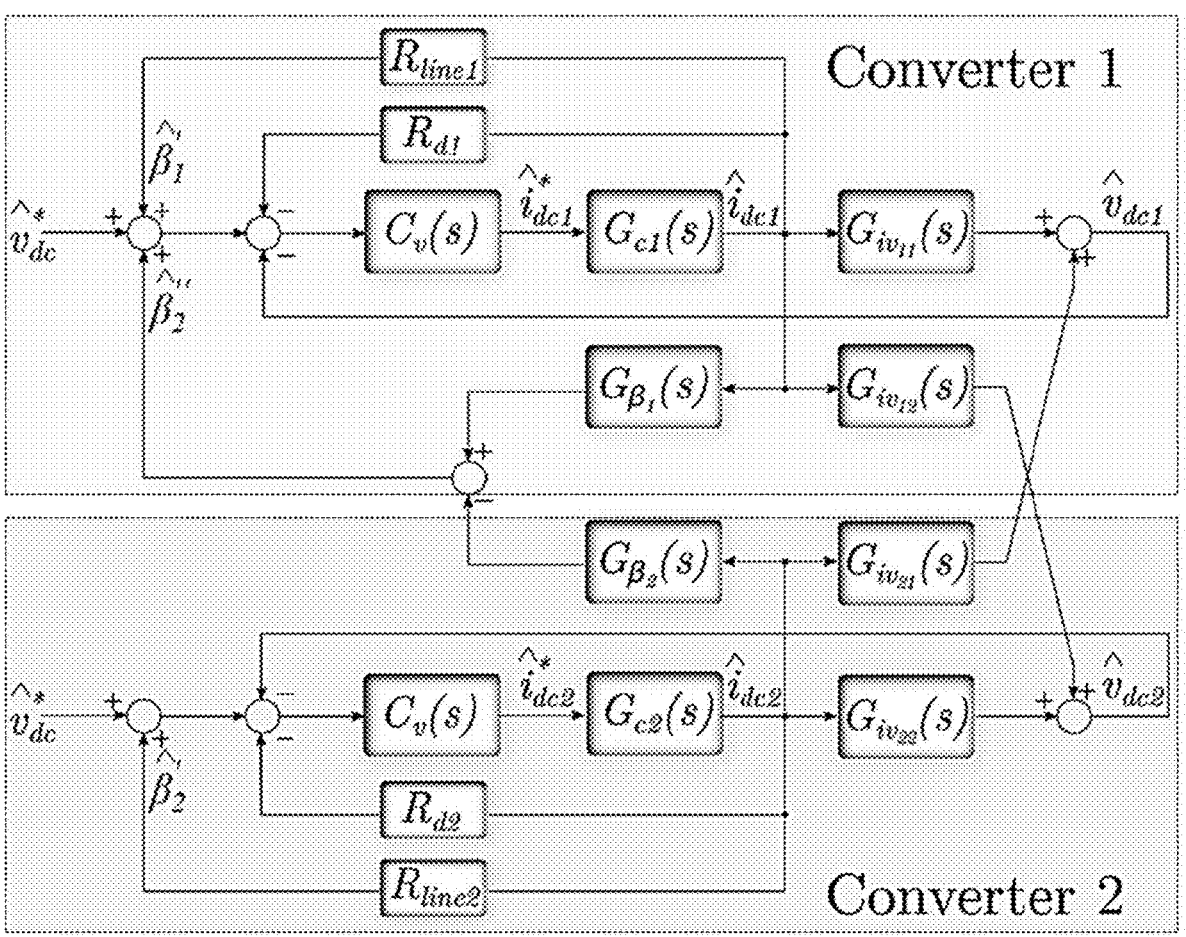
FIG. 11 illustrates an example of a small-signal model of the control methodology with conventional droop control, in accordance with various embodiments of the present disclosure.

Using Eqs. (23)-(25), FIG. 11 shows the complete small-signal model of the proposed control method with the conventional droop control. In FIG. 11, $G_{c1}$ and $G_{c2}$ are the closed-loop transfer functions of the inner current loops for converters 1 and 2, respectively. $C_v(s)$ is the transfer function of the PI controller for the voltage control loop with proportional gain as $K_{pv}$ and integral gain as $K_{iv}$. $C_v(s)$ is given as $$K_{pv} + \frac{K_{iv}}{s} \cdot \hat{v}_{dc1}$$

and $\hat{v}_{dc2}$ are expressed as a function of $\hat{i}_{dc1}$, $\hat{i}_{dc2}$, and system parameters as follows:

$$v_{dc1} = G_{iv_{11}}(s)\hat{i}_{dc1} + G_{iv_{21}}(s)\hat{i}_{dc2} \tag{26}$$

$$v_{dc2} = G_{iv_{12}}(s)\hat{i}_{dc1} + G_{iv_{22}}(s)\hat{i}_{dc2} \tag{27}$$

where $G_{iv_{ii}}(s)$ for i=1 and 2, and $G_{iv_{12}}(s)$ and $G_{iv_{21}}(s)$ are given as $$G_{iv_{11}}(s) = R_{linei} + Z_{loadi} - \frac{Z_{loadi}^2}{Z_{load1} + Z_{load2} + R_{12}} \tag{28}$$

$$G_{iv_{12}}(s) = G_{iv_{21}}(s) = \frac{Z_{loadi}Z_{loadj}}{Z_{load1} + Z_{load2} + R_{12}}. \tag{29}$$

For stability analysis, the transfer functions relating $\hat{v}_{dc1}$ with $\hat{v}_{dc}{}^*$, and $\hat{v}_{dc2}$ with $\hat{v}_{dc}{}^*$ are analyzed. To obtain these transfer functions, $\hat{i}_{dc1}$ and $\hat{i}_{dc2}$ are first expressed as:

$$\hat{i}_{dc1} = \left(\hat{v}_{dc}^* + \left(G_{\beta_{11}}(s)\hat{i}_{dc1} + G_{\beta_{21}}(s)\hat{i}_{dc2}\right) \cdot R_{12} + \right. \tag{30}$$
$$\left. \hat{i}_{dc1} R_{line1} - \hat{i}_{dc1} R_{d1} - G_{iv_{11}}(s)\hat{i}_{dc1} - G_{iv_{21}}(s)\hat{i}_{dc2}\right) \cdot C_v(s) \cdot G_{c1}(s)$$

-continued $$\hat{i}_{dc2} = \tag{31}$$
$$\left(\hat{v}_{dc}^2 + \hat{i}_{dc2} R_{line2} - \hat{i}_{dc2} R_{d2} - G_{iv_{21}}(s)\hat{i}_{dc1} - G_{iv_{22}}(s)(s)\hat{i}_{dc2}\right) \cdot C_v(s) \cdot G_{c2}(s).$$

Figure 12A:
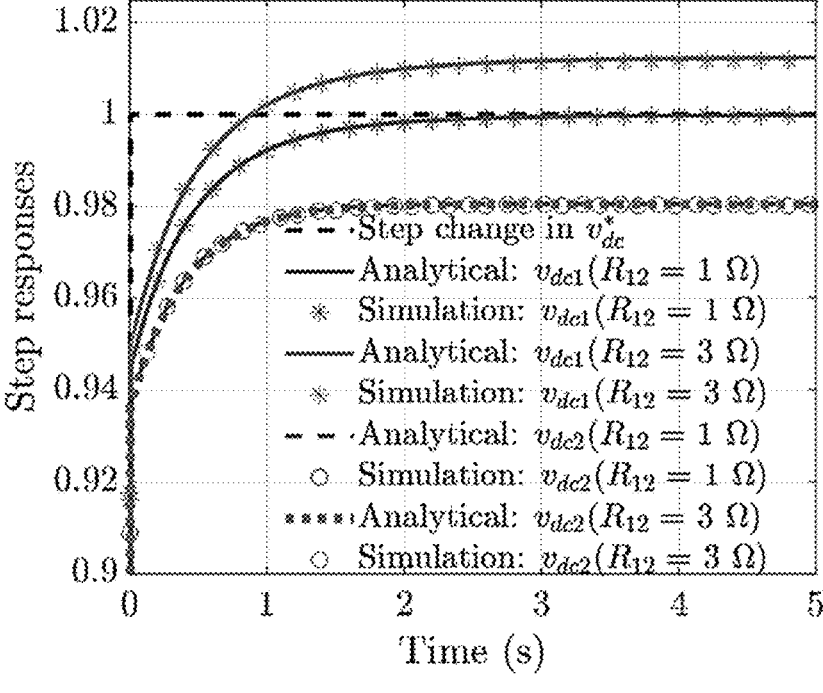
FIGS. 12A and 12B illustrate examples of small-signal model analytical and simulation results of the control methodology, in accordance with various embodiments of the present disclosure.
Figure 12B:
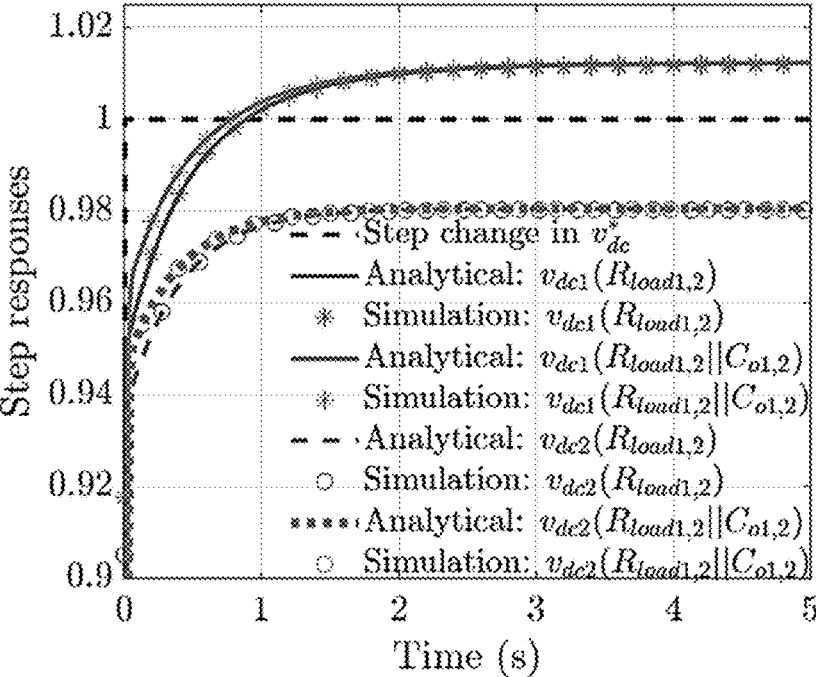

Eqs. (30) and (31) are solved to obtain closed-form solutions of $\hat{i}_{dc1}$ and $\hat{i}_{dc2}$. These solutions are then substituted in Eqs. (26) and (27) to obtain the transfer functions relating $\hat{v}_{dc1}$ with $\hat{v}_{dc}{}^*$ and $\hat{v}_{dc2}$ with $\hat{v}_{dc}{}^*$. The transfer functions obtained using the analytical model are validated using switching simulations. FIGS. 12A and 12B show the responses of $\hat{v}_{dc1}$ and $\hat{v}_{dc2}$ for a step change in $\hat{v}_{dc}{}^*$ for different system parameters. FIG. 12A shows the results for different values of $R_{12}$ and FIG. 12B shows the results for different load combinations. It can be seen that results from the analytical model and simulations are in good agreement.

Figures 13A, 13B:
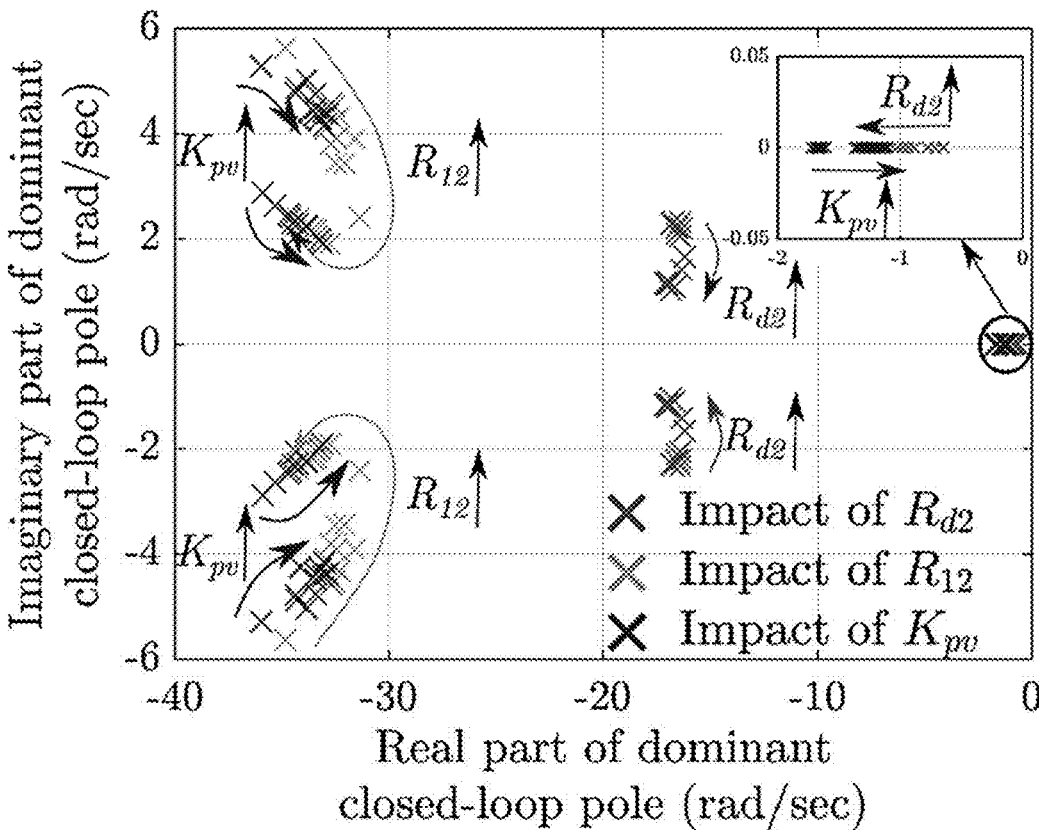
FIGS. 13A and 13B illustrates an example of stability analysis of the control methodology, in accordance with various embodiments of the present disclosure.

The stability of the proposed method is studied by sweeping one parameter at a time for an MG system with a nominal voltage of 300 V. The table in FIG. 13A shows the system parameters considered for the stability analysis. FIG. 13B shows the migration of closed-loop dominant poles for different values of $R_{d2}$, $R_{12}$, $K_{pv}$. The migration of dominant poles for variation in $R_{d2}$ is shown in FIG. 13B. With the increase in $R_{d2}$, the most dominant pole migrates toward the left-half plane (LHP), thus ensuring a stable system. The migration of the dominant pole for variation in $K_{pv}$ is shown. With the increase in $K_{pv}$, the poles migrate toward the imaginary axis but always lie in the LHP, thus again ensuring a stable system. The dominant poles with the change in $R_{12}$ are shown, and it can be seen that poles lie in the LHP, leading to a stable system.

Impact of Loss of Information from a Tie-Line Current Sensor

In this section, the decentralized nature of the proposed control is elucidated by studying the impact of loss of information from a tie-line current sensor on the current sharing accuracy of the converters. For the analysis, a three-node ring DC MG system shown in FIG. 5A is considered. Due to loss of information of the tie-line current sensor measuring $i_{32}$, $\beta_3{}''$ gets affected. $\beta_i{}''$ for i=1 to 3 are now given by:

$$\beta_1'' = i_{12} R_{12}; \beta_2'' = 0; \beta_3'' = 0. \tag{32}$$

By substituting $\beta_i{}'$ and $\beta_i{}''$ for i=1 to 3 from Eqs. (12) and (32), respectively, in Eqs. (8) and (9), the current sharing ratios among the converters are given by:

$$\frac{i_{dc1}}{i_{dc2}} = \frac{R_{d2}}{R_{d1}}; \frac{i_{dc2}}{i_{dc3}} = f(R_{di}, R_{ij}, R_{loadi}). \tag{33}$$

Here, $f(R_{di}, R_{ij}, R_{loadi})$ is a function of droop resistances, cable resistances, and load resistances. Eq. (33) shows that the loss of information of (32 changes converters' currents. However, converters 1 and 2 still achieve ideal current sharing, and the current sharing accuracies of converter 3 with converters 1 and 2 get affected. A similar analysis can be extended to DC MG systems with n nodes, and it can be shown that the loss of information of a tie-line current sensor only impacts the current sharing accuracy of the converter utilizing the information from that sensor. The remaining converters achieve accurate current sharing among themselves.

US 12,665,420 B2

13

Impact of Error in Estimates of Cable Resistances

In this section, the impact of error in estimates of cable resistances on the current sharing accuracy is studied for a two-node DC MG system shown in FIG. 3A The current sharing ratio between the two converters with the proposed control method and an error of a in the estimates of cable resistances is given by:

$$\left(\frac{i_{dc1}}{i_{dc2}}\right)_{pm} = \frac{R_{12}(R_{d2} + R_{load2}(1 - \alpha)) + R_{line2}(1 - \alpha))}{R_{12}(R_{d1} + R_{load1}(1 - \alpha) + R_{line1}(1 - \alpha))} \cdot \frac{(R_{d2} + R_{line2}(1 - \alpha))(R_{load1} + R_{load2})}{(R_{d1} + R_{line1}(1 - \alpha))(R_{load1} + R_{load2})} \quad (34)$$

α=0 and α=1 corresponds to 100% error and 0% error in the estimates of cable resistances, respectively. Current sharing ratio with only conventional droop control can be obtained by substituting α with zero in Eq. (34), and is attributed by $$\left(\frac{i_{dc1}}{i_{dc2}}\right)_d.$$

The absolute percentage errors in the current sharing accuracy with the proposed control method and with the conventional droop are given by $\epsilon_{pm}$ and $\epsilon_d$, respectively. $\epsilon_{pm}$ and $\epsilon_d$ are mathematically given as follows:

$$\epsilon_{pm} = \left|\frac{\left(\frac{i_{dc1}}{i_{dc2}}\right)_{pm} - \frac{R_{d2}}{R_{d1}}}{\frac{R_{d2}}{R_{d1}}}\right|100 \quad \epsilon_d = \left|\frac{\left(\frac{i_{dc1}}{i_{dc2}}\right)_d - \frac{R_{d2}}{R_{d1}}}{\frac{R_{d2}}{R_{d1}}}\right|100. \quad (35)$$

The comparisons of current sharing accuracy for different values of α are shown in FIGS. 14A-14D, corresponding to errors of 10%, −10%, 20% and −20%. In this example, a 300-V DC MG system is considered with two converters having the current ratings of 6 A and 3 A. The allowed voltage drop with the droop control is considered to be 5%. The droop resistances, $R_{d1}$ and $R_{d2}$ are given by 2.5Ω and 5Ω, respectively. $R_{line1}$, $R_{line2}$, and $R_{12}$ are considered to be 2, 2, and 4Ω, respectively. α is chosen to be 1.1, 0.9, 1.2, and 0.8, which corresponds to an error of 10%, −10%, 20%, and −20% in estimates of cable resistances, respectively. $R_{load1}$ and $R_{load2}$ are swept to cover the entire operating region. It can be seen from FIGS. 14A, 14B and 14D that with an error of 10%, −10%, and −20%, current sharing accuracy is always better with the proposed method ($\epsilon_d$−$\epsilon_{pm}$>0). As shown in FIG. 14C, with an error of 20%, in a few operating conditions, current sharing accuracy with the conventional droop is better ($\epsilon d$−$\epsilon_{pm}$>0). Thus, for the considered DC MG system, the current sharing accuracy with the proposed method is always better than the conventional droop across if the error in the estimates of cable resistances is less than 20% error. Similar analysis can be done for other DC MG systems.

RESULTS AND ANALYSIS

Figure 15A:
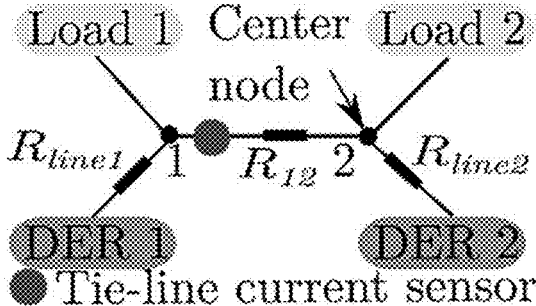
FIGS. 15A-15E illustrate examples of two-node, three-node and five-node DC MG system configurations considered for validation of the control methodology, in accordance with various embodiments of the present disclosure.
Figure 15B:
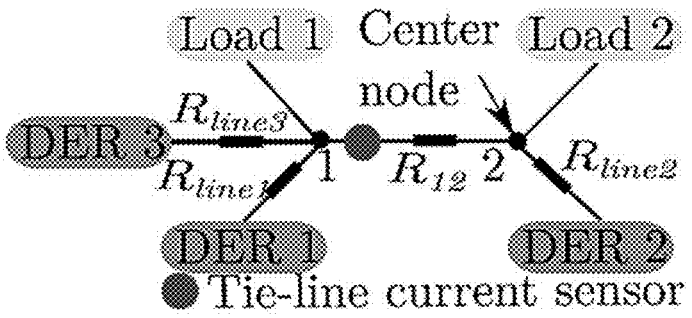
Figure 15C:
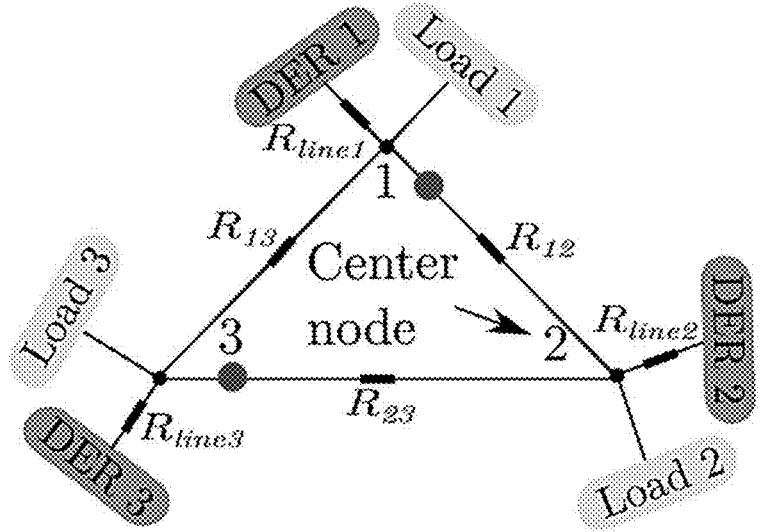

This section presents circuit simulation and experimental results to validate the proposed control method on existing and proposed DC MG systems shown in FIGS. 15A-15D. FIGS. 15A and 15C show two-node and three-node DC MG systems, respectively, with one converter at each node. FIG. 15B shows a two-node DC MG system with two converters

Figures 15D, 15E:
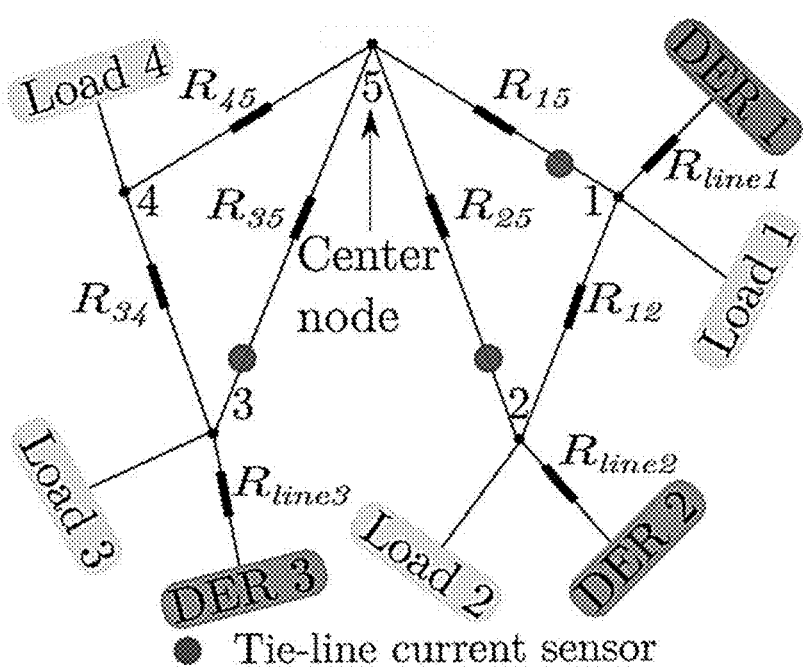

14 at node one and one converter at node two. FIG. 15D shows the proposed five-node DC MG system. To demonstrate that for the proposed mesh system, the center or pivot node can be a by-pass node, the center or pivot node does not have a load or a DER in the considered system. The system parameters considered for validation are given in the table in FIG. 15E.

Figure 16A:
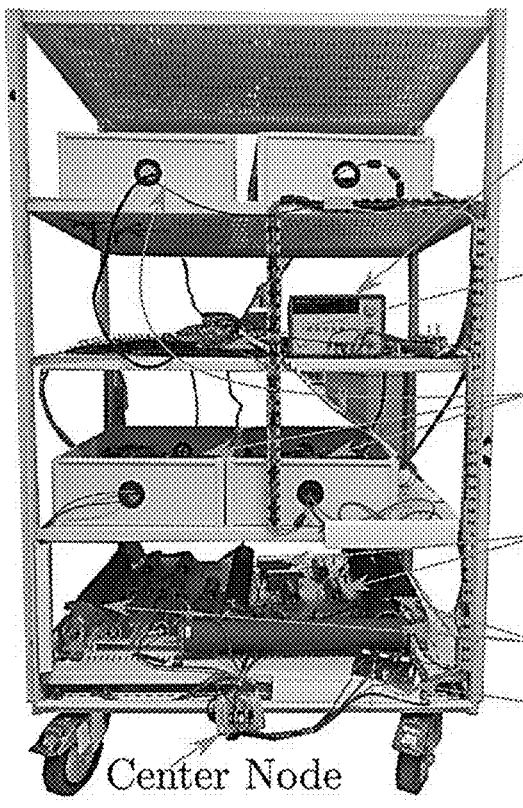
FIG. 16A-16C illustrate an example of an experimental setup of a DC MG used for validation of the control methodology, in accordance with various embodiments of the present disclosure.
Figure 16B:
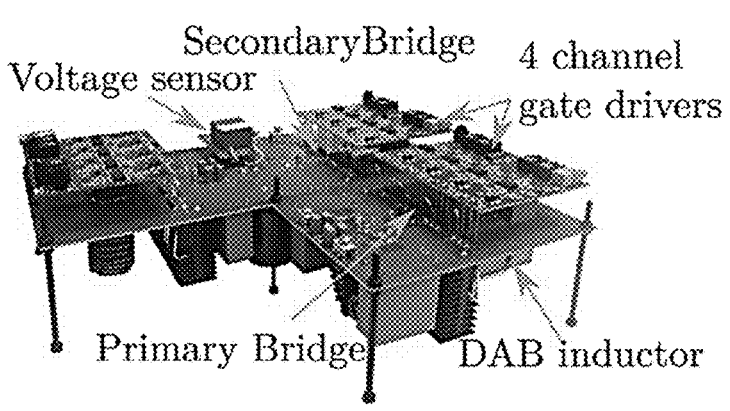
Figure 16C:
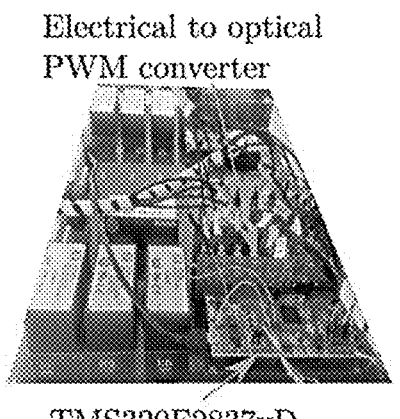

FIGS. 16A-16C include images showing the prototype of an experimental setup comprising three Dual-Active-Bridge (DAB) converters, which are controlled with a TMS320F2837xD launchpad DSP. FIG. 16A shows the full experimental setup, FIG. 16B shows a single DAB converter, and FIG. 16C shows the interface board and controller. Since the setup was used to validate the proposed control methodology under steady-state conditions, the inductance and capacitance of the cables did not play a role. Hence, cable impedances were emulated using fixed resistors.

Figure 17A:
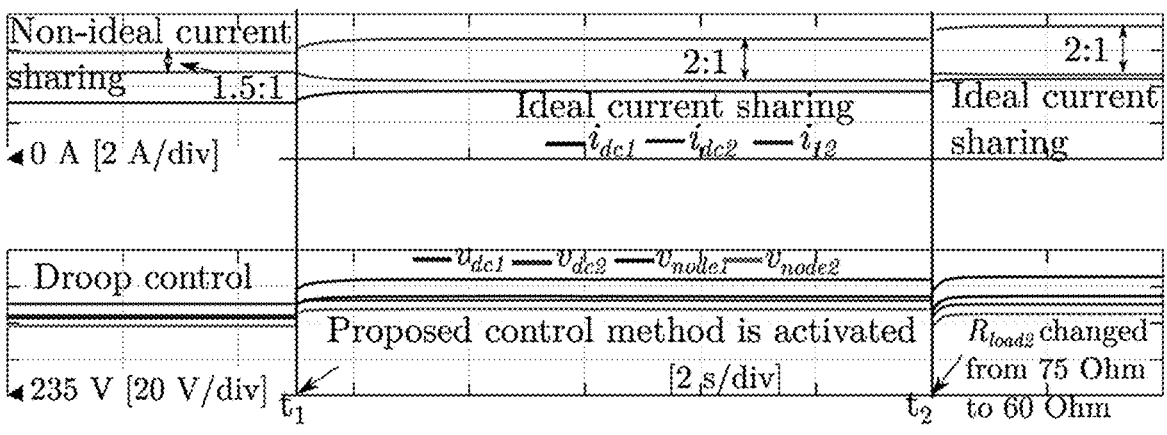
FIGS. 17A and 17B illustrate examples of switching simulation and experimental results for a two-node MG system, in accordance with various embodiments of the present disclosure.
Figure 17B:
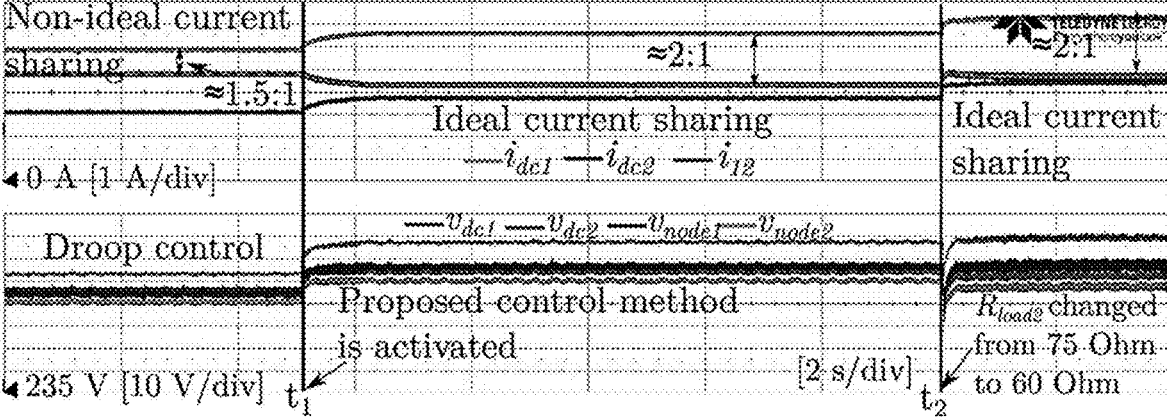

System I—Two-Node. FIGS. 17A and 17B illustrate switching simulation and experimental results, respectively, for a two-node DC MG system shown in FIG. 15A. The proposed control method was activated at $t_1$ s, before which the converters were controlled with only droop control. In the switching simulation and experimental results of FIGS. 17A and 17B, $R_{load1}$ and $R_{load2}$ are 100 and 75Ω, respectively. To demonstrate the performance in dynamic conditions, $R_{load2}$ was changed from 75 to 60Ω. The proposed control method achieved ideal current sharing before and after the load change. With these operating conditions, the tie-line current, $i_{12}$ flowed from node one to node two. FIGS. 17A and 17B show that the switching simulation and experimental results are in a good correlation. For brevity, only experimental results are now shown for system-II.

Figure 18:
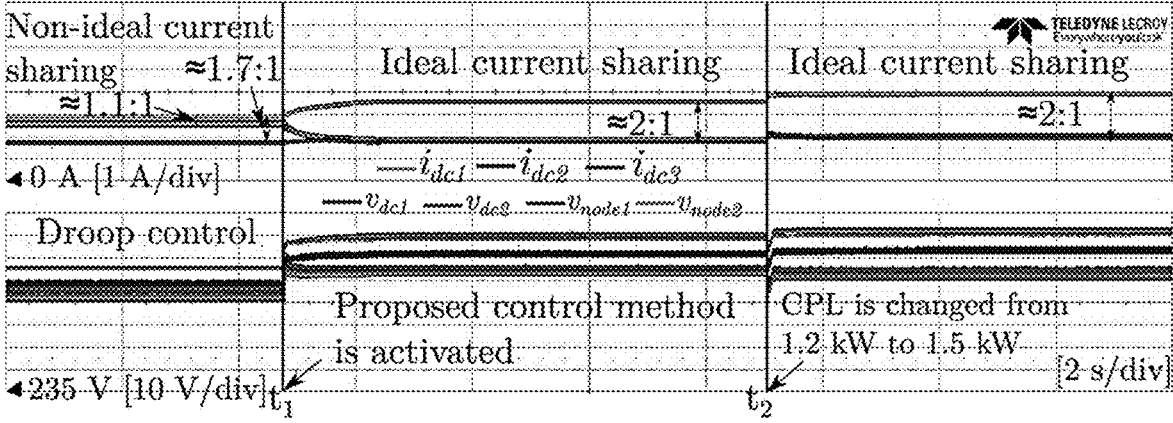
FIG. 18 illustrates an example of experimental results for a two-node MG system, in accordance with various embodiments of the present disclosure.

System II—Two-Node. FIG. 18 shows the experimental results for system-II shown in FIG. 15B. Load at node one is 100Ω, and a constant power load (CPL) of 1200 W at node two is considered. The CPL at node two is changed to 1500 W at $t_2$ s. With the proposed control method, ideal current sharing is achieved among all the converters. This result validates that the proposed control method is effective for a DC MG system with any number of converters at a node and for any type of load.

Figure 20:
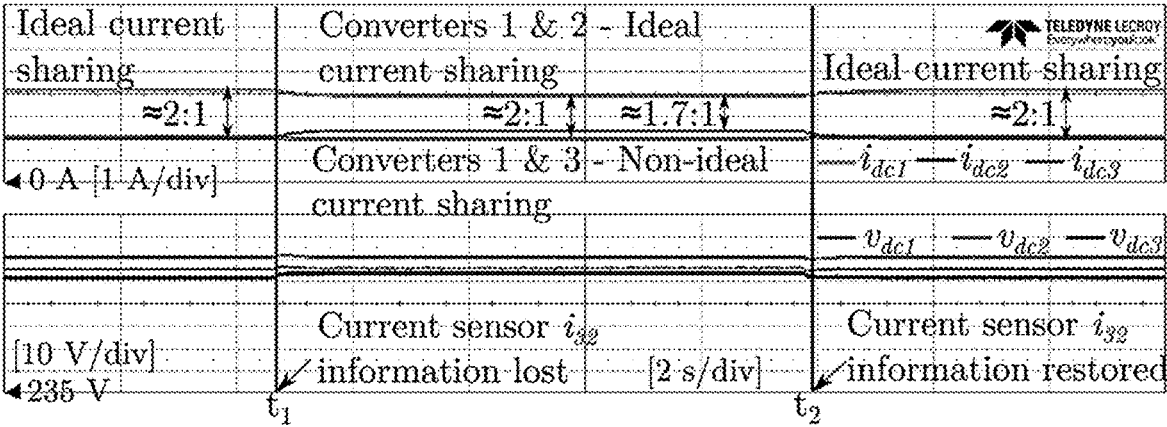
FIGS. 20 and 21 illustrate effects of loss of information of a tie-line current sensor and seamless hot swapping for a three-node MG system, in accordance with various embodiments of the present disclosure.
Figure 21:
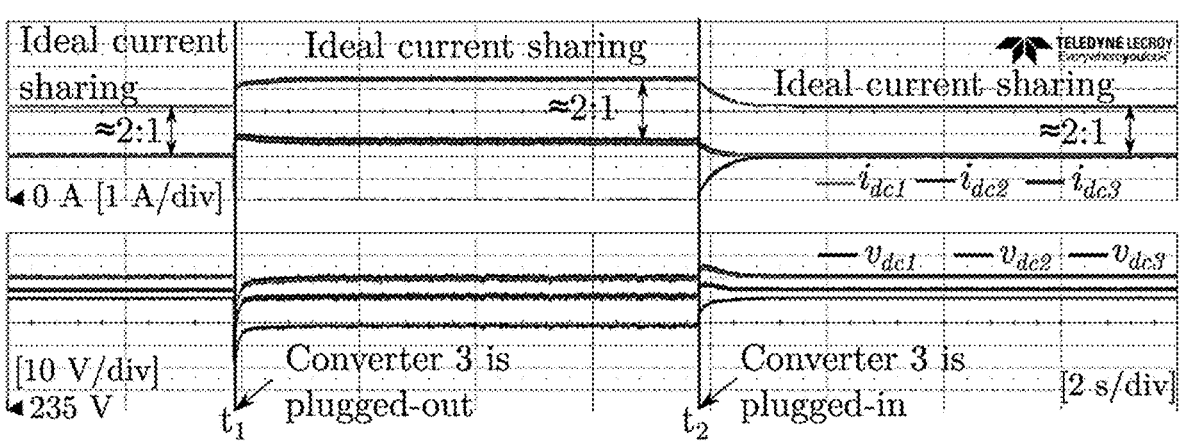

System III—Three-Node. FIGS. 19A-19B, 20 and 21 show the results for different scenarios for a three-node DC MG system shown in FIG. 15C. In these results, loads at node one and node two are 100 and 68Ω, respectively. The load at the node three is 200Ω for switching simulation and experimental results in FIGS. 19A and 19B, respectively, and is CPL of 500 W for results in FIGS. 20 and 21. FIG. 20 illustrated the effect of loss of information of a tie-line current sensor and FIG. 21 illustrates a seamless hot swap.

Figure 19A:
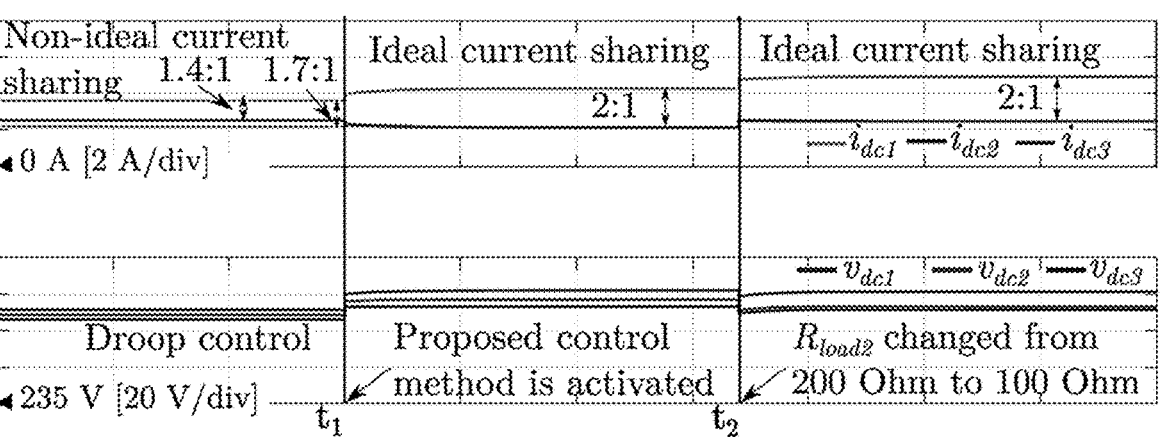
FIGS. 19A and 19B illustrate examples of switching simulation and experimental results for a three-node MG system, in accordance with various embodiments of the present disclosure.
Figure 19B:
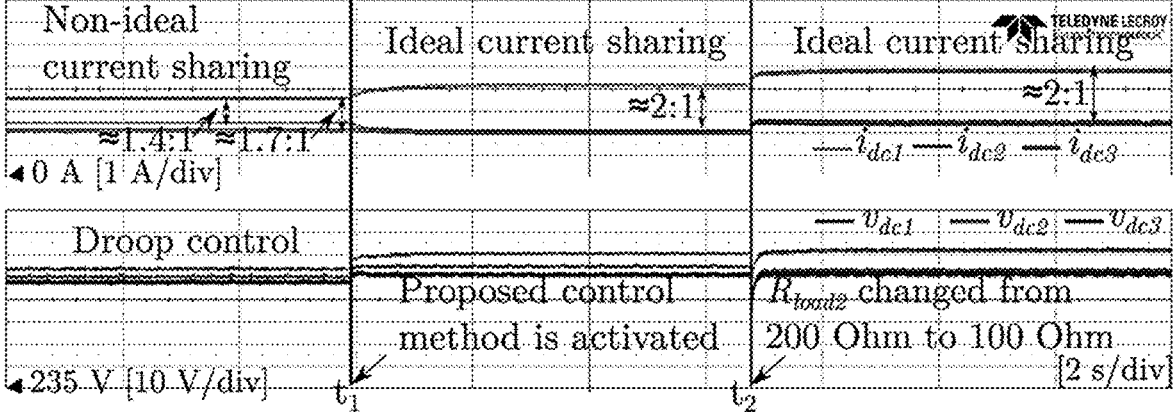

For the switching simulation and experimental results of FIGS. 19A and 19B, the proposed method is activated at $t_1$ s, before which converters were controlled with the droop control. The load was changed to 100Ω at $t_2$ s. With the proposed control method, ideal current sharing was achieved before and after the load change. FIGS. 19A and 19B. show that the simulation and experimental results are in a good correlation. For brevity, only experimental results are shown for the three-node system.

Impact of Loss of Information of a Tie-Line Current Sensor: FIG. 20 shows the results for the loss of information of tie-line current sensor measuring $i_{32}$. The proposed control method is active throughout the time duration. At $t_1$ s, due to the loss of information, converter three does not compensate for the voltage drop for $R_{32}$. Thus, $\beta_3$" is now given by zero. It can be seen that converters one and two still achieve accurate current sharing, and current sharing accuracy degrades only for converter three. This result illustrates that the proposed control method is decentralized in nature. Loss of information of one tie-line current sensor does not disturb the current sharing accuracy among the remaining converters. At $t_2$ s, the information from tie-line current sensor is restored, and ideal current sharing is again achieved among all the converters.

Seamless Hot Swap of a Converter: FIG. 21 shows the experimental results for hot swap of a converter from the DC MG system. Here, the proposed control method is active throughout the time duration. Converter three is taken out of the DC MG at $t_1$ s, and the load is shared among converters one and two in the ideal ratio. At $t_2$ s, converter three is added again, and all converters share the load in the ideal manner. The result illustrates the ease of adding or removing of a converter with the proposed method.

Figure 22A:
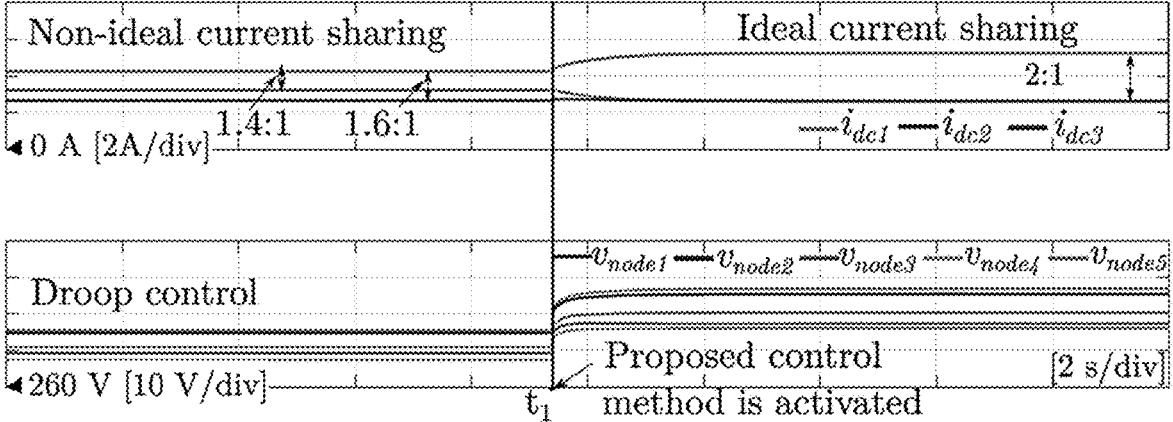
FIGS. 22A and 22B illustrate examples of switching simulation and experimental results for a five-node MG system, in accordance with various embodiments of the present disclosure.
Figure 22B:
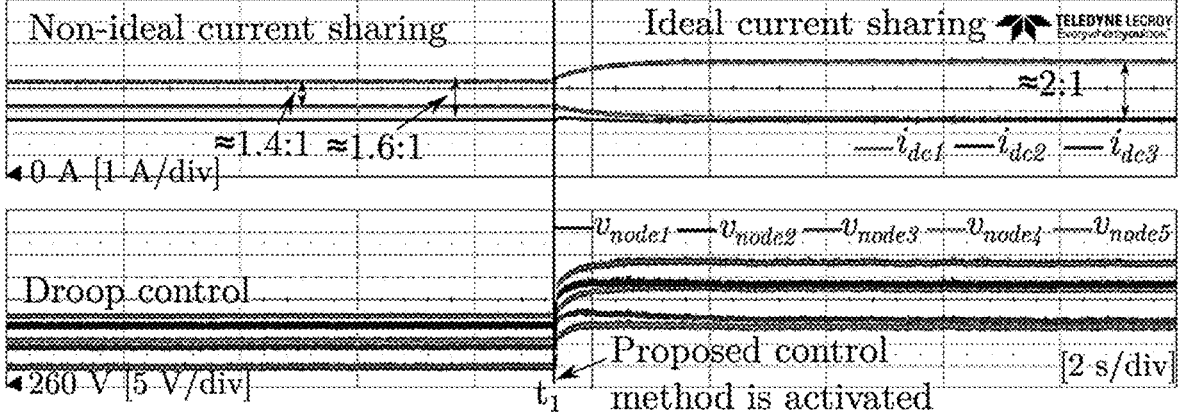

System IV—Five-Node Configuration. FIGS. 22A and 22B show the switching simulation and experimental results with the proposed five-node DC MG system shown in FIG. 15D. The loads at nodes one to four are 100, 135, 100, and 100$\Omega$, respectively. It can be seen that with the proposed control method, ideal current sharing is achieved. The results validate that the center node can be a bypass node and does not need to have a DER or a load. FIGS. 22A and 22B also show that the switching simulation and experimental results are in a good correlation.

A new and scalable mesh configuration and a decentralized secondary control method for droop-controlled converters has been presented to achieve accurate current sharing among all the converters. It was shown that accurate current sharing among all the converters cannot be achieved without a communication network for ring configuration with more than three nodes. The mesh DC MG system was utilized with the proposed control method for a four-node DC MG system. New MG configurations inspired by k-partite graphs in graph theory are proposed for DC MG systems with more than four nodes, which enabled accurate current sharing among all the converters with the proposed control method. The proposed control method was validated using extensive circuit simulations and experimental results for different configurations of dc MG systems. The hardware-based experimental results correlated well with the circuit simulation results and theoretical predictions. Further, the experimental results illustrate that the proposed control method was decentralized in nature, and a converter could be added or removed seamlessly.

Figure 23:
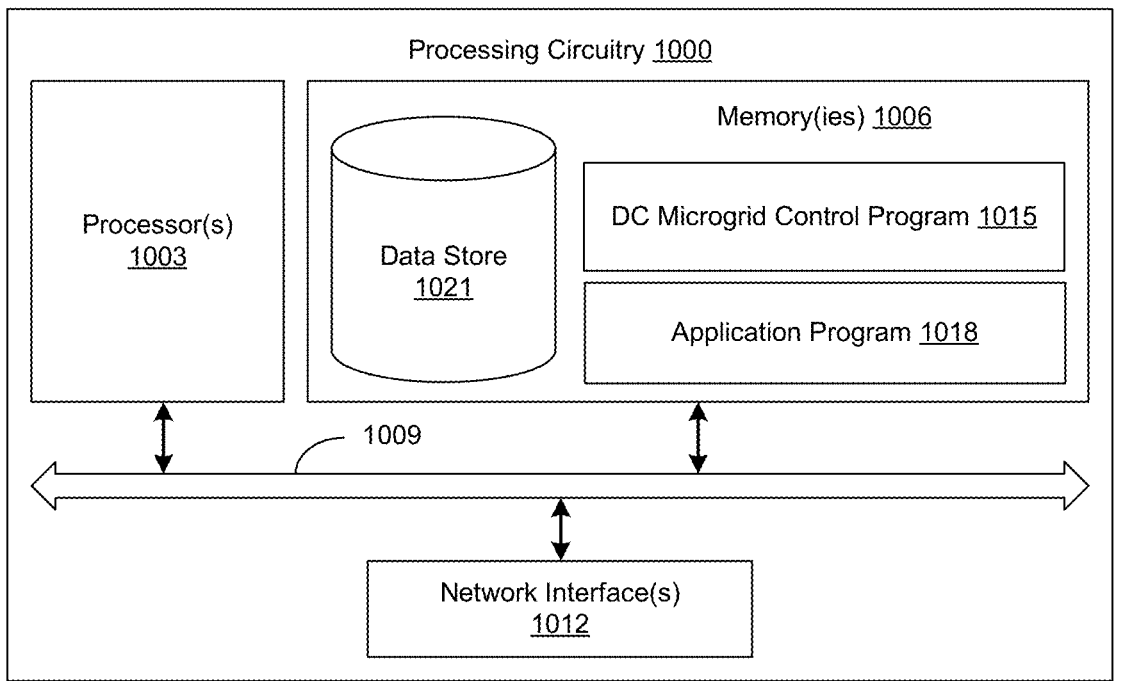
FIG. 23 is a schematic diagram illustrating an example of processing circuitry that can be used to implement the DC MG control, in accordance with various embodiments of the present disclosure.

Referring next to FIG. 23, shown is a schematic diagram illustrating an example of a processing circuitry 1000 that can be used for DC microgrid control, in accordance with various embodiments of the present disclosure. The processing circuitry 1000 can include at least one processor circuit having, for example, a processor 1003 and a memory 1006, both of which are coupled to a local interface 1009. The local interface 1009 may comprise, for example, a data bus with an accompanying address/control bus or other bus structure as can be appreciated. The processing circuitry 1000 can comprise one or more computing/processing device such as, e.g., a smartphone, tablet, computer, controller, etc. To this end, each processing circuitry 1000 may comprise, for example, at least one server computer or like device, which can be utilized in a cloud-based environment.

In some embodiments, the processing circuitry 1000 can include one or more network interfaces 1012. The network interface 1012 may comprise, for example, a wireless transmitter, a wireless transceiver, and/or a wireless receiver. The network interface 1012 can communicate to a remote computing/processing device or other components using a Bluetooth, WiFi, or other appropriate wireless protocol. As one skilled in the art can appreciate, other wireless protocols may be used in the various embodiments of the present disclosure. The network interface 1012 can also be configured for communications through wired connections.

Stored in the memory 1006 are both data and several components that are executable by the processor(s) 1003. In particular, stored in the memory 1006 and executable by the processor 1003 can be a DC microgrid control application 1015 which can control power converter operation as disclosed herein, and potentially other applications 1018. In this respect, the term "executable" means a program file that is in a form that can ultimately be run by the processor(s) 1003. Also stored in the memory 1006 may be a data store 1021 and other data. In addition, an operating system may be stored in the memory 1006 and executable by the processor(s) 1003. It is understood that there may be other applications that are stored in the memory 1006 and are executable by the processor(s) 1003 as can be appreciated.

Examples of executable programs may be, for example, a compiled program that can be translated into machine code in a format that can be loaded into a random access portion of the memory 1006 and run by the processor(s) 1003, source code that may be expressed in proper format such as object code that is capable of being loaded into a random access portion of the memory 1006 and executed by the processor(s) 1003, or source code that may be interpreted by another executable program to generate instructions in a random access portion of the memory 1006 to be executed by the processor(s) 1003, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores, and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, ultrasound or other devices. The processor 1003 may be of electrical or of some other available construction.

Although the DC microgrid control application 1015, and other various applications 1018 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the DC microgrid control application 1015, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the DC microgrid control application 1015, may be implemented and structured in a variety of ways. For example, one or more applications described may be implemented as modules or components of a single application. For example, the DC microgrid control application 1015 can include a wide range of modules such as, e.g., an initial model or other modules that can provide specific functionality for the disclosed methodology. Further, one or more applications described herein may be executed in shared or separate computing/processing devices or a combination thereof. For example, a plurality of the applications described herein may execute in the same processing circuitry 1000, or in multiple computing/processing devices in the same computing environment. To this end, each processing circuitry 1000 may comprise, for example, at least one server computer or like device, which can be utilized in a cloud-based environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
a mesh DC microgrid network having at least 4 microgrid DC nodes consisting of a pivot node comprising one or more converters connected to the pivot node and remaining DC microgrid nodes comprising one or more converters connected to at least one of the remaining DC microgrid nodes, the at least 4 microgrid DC nodes interconnected by tie-lines,
where the mesh DC microgrid network is organized as a plurality of clusters of three node DC microgrid systems, wherein each cluster comprises three of the at least 4 microgrid DC nodes,
wherein, in each cluster, one of the DC microgrid nodes is the pivot node that links remaining clusters together within the mesh DC microgrid network, and
wherein each remaining DC microgrid node of the mesh DC microgrid network is directly connected to the pivot node by a respective one of the tie-lines comprising a respective tie-line current sensor,
where the one or more converters at respective remaining DC microgrid nodes are each controlled using droop control having a feedforward voltage offset generated based at least in part upon respective tie-line current sensor information and cable resistance of the respective tie-line directly connecting the respective remaining DC microgrid node to the pivot node,
where the one or more converters at the pivot node are each controlled using droop control having a zero feedforward voltage offset.

2. The system of claim 1, wherein each microgrid node in the mesh DC microgrid network has a redundant current path.

3. The system of claim 1, wherein the feedforward voltage offset for the one or more converters at the remaining DC microgrid nodes is generated based at least in part upon prior estimates of cable resistances of the tie-lines.

4. The system of claim 1, wherein the system is enabled to provide current sharing among the DC microgrid nodes without using a communication network to exchange information between converters.

5. The system of claim 1, wherein the mesh DC microgrid network comprises 5 or more microgrid DC nodes.

6. The system of claim 1, wherein the pivot node does not comprise a load connected to the pivot node.

7. A system, comprising:

a mesh DC microgrid network having three microgrid DC nodes comprising a pivot node comprising one or more converters connected to the pivot node and two remaining microgrid DC nodes, the two remaining microgrid DC nodes comprising one or more converters connected to at least one of the two remaining microgrid DC nodes, each of the two remaining microgrid DC nodes directly connected to the pivot node by a respective tie-line comprising a respective tie-line current sensor, where the one or more converters at the two remaining DC microgrid nodes are each controlled using droop control having a feedforward voltage offset generated based at least in part upon respective tie-line current sensor information and cable resistance of the respective tie-line directly connecting the respective two remaining DC microgrid nodes to the pivot node, where the one or more converters at the pivot node are each controlled using droop control having a zero feedforward voltage offset, and the system is enabled to provide current sharing among the three DC microgrid nodes without using a communication network to exchange information between converters.

8. The system of claim 7, wherein the feedforward voltage offset for the one or more converters at the remaining DC microgrid nodes is generated based at least in part upon prior estimates of cable resistances of the tie-lines.

9. The system of claim 7, wherein the two remaining microgrid DC nodes are connected to each other by a tie-line.

10. A system, comprising:

a mesh DC microgrid network having two microgrid DC nodes comprising a pivot node comprising one or more converters connected to the pivot node and one remaining microgrid DC node comprising one or more converters connected to the one remaining microgrid DC node, the one remaining microgrid DC node directly connected to the pivot node by a tie-line comprising a tie-line current sensor, where the one or more converters at the one remaining DC microgrid node are controlled using droop control having a feedforward voltage offset generated based at least in part upon tie-line current sensor information and cable resistance of the tie-line, where the one or more converters at the pivot node are each controlled using droop control having a zero feedforward voltage offset, and the system is enabled to provide current sharing among the two DC microgrid nodes without using a communication network to exchange information between converters.

11. The system of claim 10, wherein the feedforward voltage offset for the one or more converters at the one remaining DC microgrid node is generated based at least in part upon prior estimates of cable resistances of the tie-lines.

* * * * *